(12) United States Patent
Nagatsuka et al.

(10) Patent No.: US 10,902,629 B2
(45) Date of Patent: Jan. 26, 2021

(54) INFORMATION PROCESSING DEVICE, INFORMATION PROCESSING METHOD, AND PROGRAM

(71) Applicant: Sony Interactive Entertainment Inc., Tokyo (JP)

(72) Inventors: Norio Nagatsuka, Saitama (JP); Takeshi Yamagishi, Kanagawa (JP)

(73) Assignee: Sony Interactive Entertainment Inc., Tokyo (JP)

( * ) Notice: Subject to any disclaimer, the term of this patent is extended or adjusted under 35 U.S.C. 154(b) by 28 days.

(21) Appl. No.: 16/464,441

(22) PCT Filed: Nov. 28, 2017

(86) PCT No.: PCT/JP2017/042475
§ 371 (c)(1),
(2) Date: May 28, 2019

(87) PCT Pub. No.: WO2018/105433
PCT Pub. Date: Jun. 14, 2018

(65) Prior Publication Data
US 2019/0385331 A1    Dec. 19, 2019

(30) Foreign Application Priority Data

Dec. 5, 2016 (JP) ................................ 2016-236277

(51) Int. Cl.
*G06T 7/70* (2017.01)
*B25J 9/16* (2006.01)
*G06K 9/62* (2006.01)

(52) U.S. Cl.
CPC .............. *G06T 7/70* (2017.01); *B25J 9/1697* (2013.01); *G06K 9/6256* (2013.01)

(58) Field of Classification Search
CPC ... G06T 7/70; G06T 7/60; B25J 9/1697; B25J 19/04; G06K 9/6256; G06K 9/6255
(Continued)

(56) References Cited

U.S. PATENT DOCUMENTS

| 7,200,260 B1 | 4/2007 | Watanabe |
| 9,111,348 B2 | 8/2015 | Amma |

(Continued)

FOREIGN PATENT DOCUMENTS

| JP | 2000288968 A | 10/2000 |
| JP | 2003346152 A | 12/2003 |

(Continued)

OTHER PUBLICATIONS

International Search Report for corresponding PCT Application No. PCT/JP2017/042475, 2 pages, dated Feb. 27, 2018.
(Continued)

*Primary Examiner* — Congvan Tran
(74) *Attorney, Agent, or Firm* — Matthew B. Dernier, Esq.

(57) ABSTRACT

There is provided an information processing device including a processor that realizes: a dictionary data acquisition function that acquires dictionary data related to an object; an image acquisition function that acquires a first image of the object; a first angle estimation function that estimates an angle of the object in the first image on the basis of the first image and the dictionary data; a second angle estimation function that re-estimates an angle of the object in the first image after a physical operation related to the object; and a dictionary data update function that updates the dictionary data in response to a result of estimation by the first angle estimation function and a result of re-estimation by the second angle estimation function.

12 Claims, 16 Drawing Sheets

(58) Field of Classification Search
USPC .................................................. 382/103, 159
See application file for complete search history.

(56) References Cited

U.S. PATENT DOCUMENTS

| | | | |
|---|---|---|---|
| 2003/0144765 A1 | 7/2003 | Habibi | |
| 2009/0196467 A1* | 8/2009 | Okubo | G06K 9/00288 |
| | | | 382/118 |
| 2011/0069880 A1 | 3/2011 | Sergieiev | |
| 2013/0006423 A1 | 1/2013 | Ito | |
| 2013/0010095 A1* | 1/2013 | Aoki | H04N 5/23219 |
| | | | 348/77 |
| 2013/0202212 A1 | 8/2013 | Wu | |
| 2013/0329035 A1 | 12/2013 | Yamamoto | |
| 2014/0204018 A1* | 7/2014 | Murase | G06F 3/0426 |
| | | | 345/156 |
| 2014/0270361 A1 | 9/2014 | Amma | |
| 2014/0294292 A1 | 10/2014 | Aoba | |
| 2016/0033270 A1* | 2/2016 | Von Matern | G01S 5/163 |
| | | | 348/169 |

FOREIGN PATENT DOCUMENTS

| | | |
|---|---|---|
| JP | 2005128959 A | 5/2005 |
| JP | 2011523718 A | 8/2011 |
| JP | 2016103094 A | 6/2016 |
| JP | 2016517084 A | 6/2016 |
| WO | 2009141783 A1 | 11/2009 |
| WO | 2014151035 A1 | 9/2014 |

OTHER PUBLICATIONS

International Search Report for related PCT Application No. PCT/JP2017/042476, 2 pages, dated Feb. 27, 2019.
International Preliminary Report on Patentability and Written Opinion for corresponding PCT Application No. PCT/JP2017/042475, 8 pages, dated Jun. 11, 2019.
International Preliminary Report on Patentability and Written Opinion for corresponding PCT Application No. PCT/JP2017/042476, 10 pages, dated Jun. 11, 2019.
Extended European Search Report for corresponding EP Application No. 17878629.9, 7 pages, dated May 29, 2020.
Extended European Search Report for related EP Application No. 17879522.5, 9 pages, dated Apr. 16, 2020.
Felix Endres et al: "An evaluation of the RGB-D SLAM system", Robotics and Automation (ICRA). 2012 International Conference on. IEEE, pp. 1691-1696, dated May 14, 2012.

* cited by examiner

INFORMATION PROCESSING DEVICE, INFORMATION PROCESSING METHOD, AND PROGRAM

TECHNICAL FIELD

The present invention relates to an information processing device, an information processing method, and a program.

BACKGROUND ART

Image-based object recognition is a common technique these days. In the image-based object recognition, an object in an image is recognized by, for example, extracting a feature amount of an image captured by an imaging device and performing matching between the feature amount and a feature amount registered in advance as dictionary data. In this case, changing an angle of the object in the image causes a change in the feature amount; thus, it is necessary to prepare dictionary data per angle of the object to enhance availability of object recognition.

PTL 1 and 2 are examples of a technique for preparing dictionary data per angle of an object in image-based object recognition. PTL 1 describes a technique for recognizing an object on the basis of eight images obtained by rotating an object at intervals of 45 degrees. PTL 2 describes a technique for learning an object model by recognizing common parts from many images obtained by rotating an object at intervals of five degrees or the like in a horizontal angle direction and a zenith angle direction.

CITATION LIST

Patent Literature

[PTL 1] JP 2003-346152A [PTL 1] U.S. Patent Application Publication No. 2013/0202212

SUMMARY

Technical Problem

The above techniques are for recognizing an object in the image, that is, estimating an identity of the object in the image, and are not intended to extract further, additional information from the image. Nevertheless, if it is taken into account that the technique of the object recognition has been recently applied to diverse fields, providing additional information regarding an object on the basis of the image is considered to be advantageous.

An object of the present invention is, therefore, to provide novel and improved information processing device, information processing method, and program that can estimate an angle of an object on the basis of an image and autonomously update data for estimation.

Solution to Problem

According to one aspect of the present invention, there is provided an information processing device including a processor that realizes a dictionary data acquisition function that acquires dictionary data related to an object, an image acquisition function that acquires a first image of the object, a first angle estimation function that estimates an angle of the object in the first image on the basis of the first image and the dictionary data, a second angle estimation function that re-estimates an angle of the object in the first image after a physical operation related to the object, and a dictionary data update function that updates the dictionary data in response to a result of estimation by the first angle estimation function and a result of re-estimation by the second angle estimation function.

Furthermore, according to another aspect of the present invention, there is provided an information processing method including a step of acquiring dictionary data related to an object, a step of acquiring a first image of the object, a step of estimating an angle of the object in the first image on the basis of the first image and the dictionary data, a step of re-estimating an angle of the object in the first image after a physical operation related to the object, and a step of updating, by a processor, the dictionary data in response to a result of estimation and a result of re-estimation.

Moreover, according to yet another aspect of the present invention, there is provided a program for causing a processor to realize a dictionary data acquisition function that acquires dictionary data related to an object, an image acquisition function that acquires a first image of the object, a first angle estimation function that estimates an angle of the object in the first image on the basis of the first image and the dictionary data, a second angle estimation function that re-estimates an angle of the object in the first image after a physical operation related to the object, and a dictionary data update function that updates the dictionary data in response to a result of estimation by the first angle estimation function and a result of re-estimation by the second angle estimation function.

DESCRIPTION OF EMBODIMENTS

Several embodiments of the present invention will be described hereinafter in detail with reference to the accompanying drawings. It is noted that constituent elements having substantially the same functional configurations are denoted by the same reference symbols and will not be repetitively described in the present specification and the drawings.

First Embodiment

Figure 1:
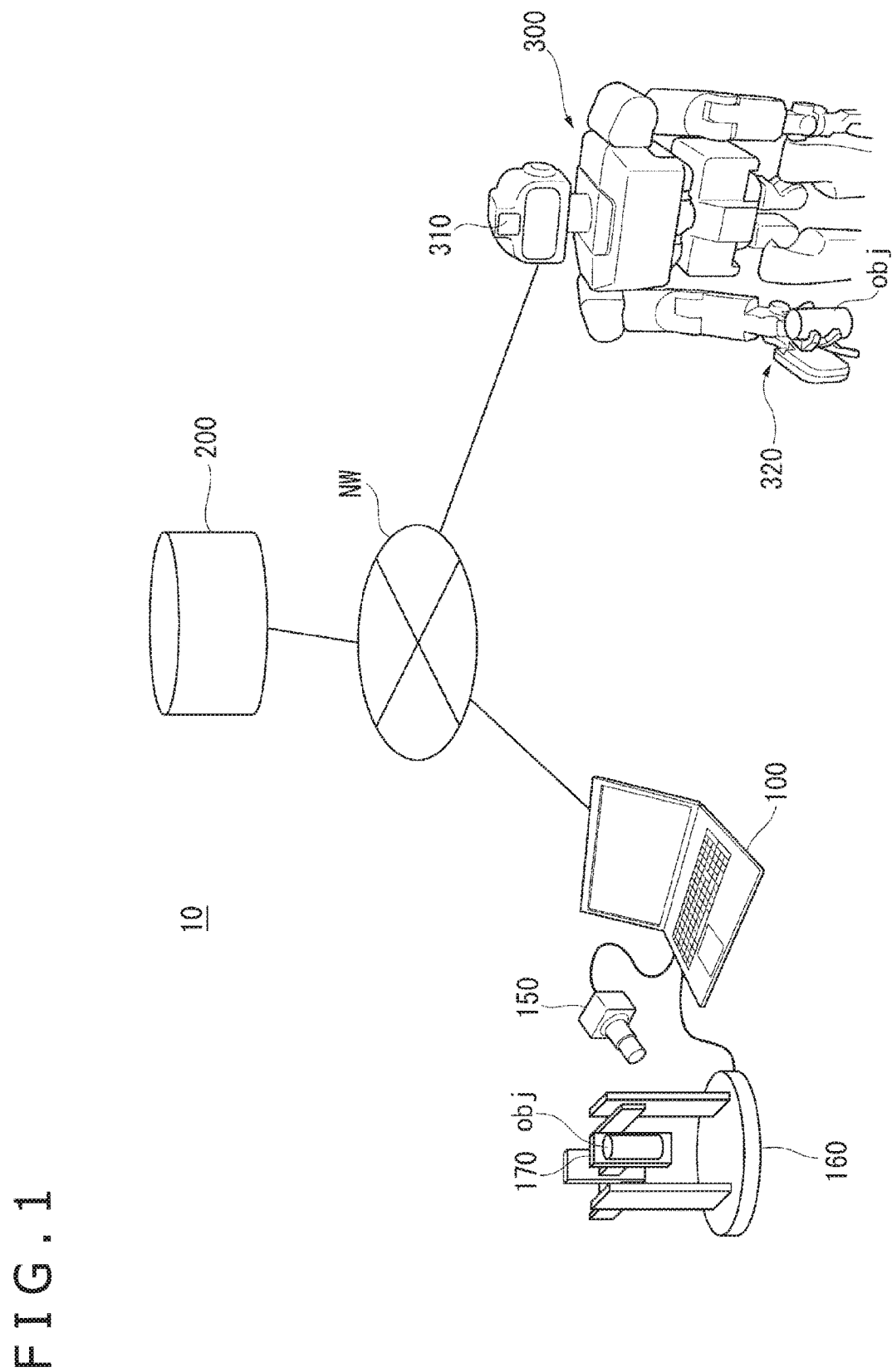
FIG. 1 is a schematic diagram of a system according to a first embodiment of the present invention.

FIG. 1 is a schematic diagram of a system 10 according to a first embodiment of the present invention. With reference to FIG. 1, the system 10 includes a terminal 100, a database 200, and a robot 300 connected to one another by a network NW. A camera 150 and a camera platform device 160 are connected to the terminal 100. The robot 300 includes a camera 310 and a manipulator 320.

In the system 10 described above, the camera 150 captures an image of an object obj mounted on the camera platform device 160 via a jig 170 to be described later. The terminal 100 acquires the image from the camera 150 and acquires angle information indicating an angle of the object obj from the camera platform device 160. It is noted that the angle of the object obj is an angle in a three-dimensional space, for example, an angle represented by rotation amounts about three axes in an orthogonal coordinate system. The terminal 100 generates dictionary data on the basis of the acquired image and angle information (as well as identification information regarding the object obj). The generated dictionary data is stored in the database 200.

Meanwhile, the robot 300 captures an image of the object obj using the camera 310 in a state in which the manipulator 320 grips the object obj. The robot 300 recognizes the object obj in the image and further estimates an angle of the object obj in the image on the basis of the captured image and the dictionary data acquired from the database 200.

The robot 300 can thereby further estimate the angle of the object obj gripped by the manipulator 320 upon recognizing the object obj. This angle indicates, for example, how much the object obj rotates with respect to a reference posture. The robot 300 can rotate the object obj by, for example, controlling the manipulator 320 on the basis of an angle estimation result and can thereby make the object obj in a desired posture.

The system 10 described above is useful at a time of, for example, automating work for arranging or organizing articles using the robot 300. The system 10 is also useful for identifying how to rotate the object obj to, for example, read information (a printed code, a radio frequency identifier (RFID), or the like) placed in a predetermined site of the object obj. It is noted that the use application of the system 10 is not limited to the examples above but can include other various use applications.

(Configuration for Generating Dictionary Data)

Figure 2:
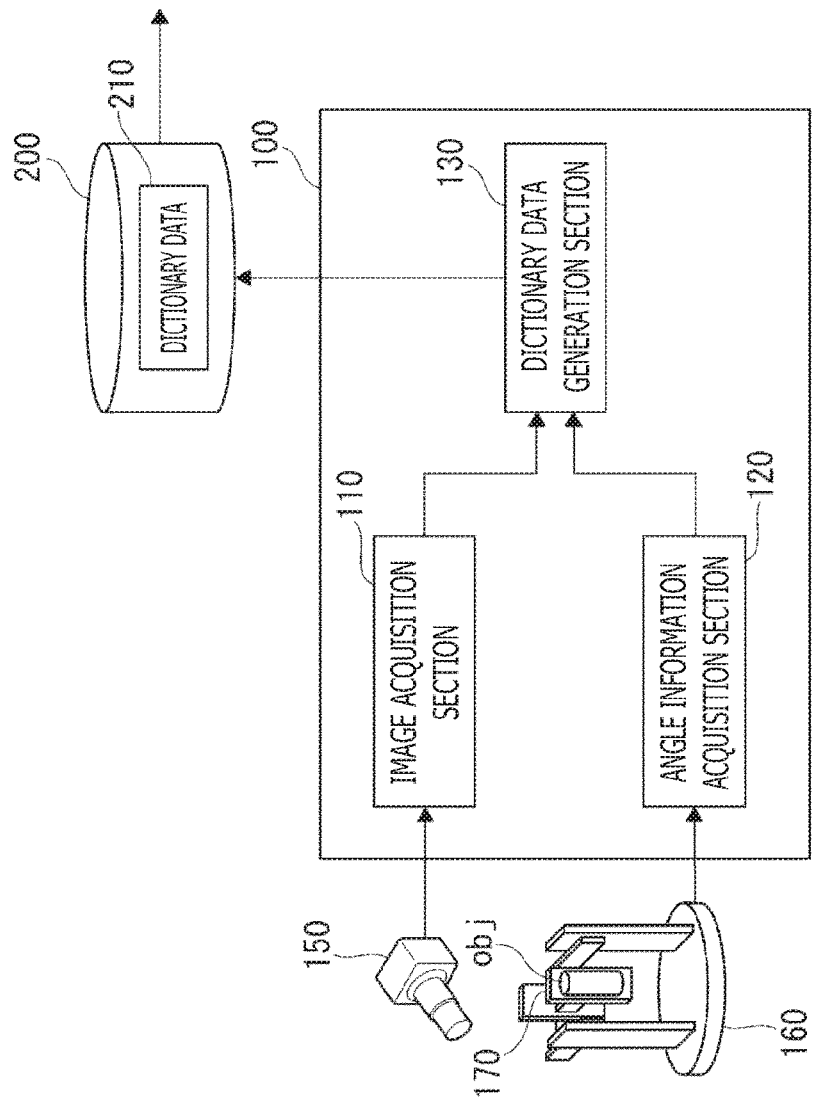
FIG. 2 is a block diagram depicting a functional configuration of a terminal in the system depicted in FIG. 1.

FIG. 2 is a block diagram depicting a functional configuration of the terminal 100 in the system depicted in FIG. 1. With reference to FIG. 2, the terminal 100 includes an image acquisition section 110, an angle information acquisition section 120, and a dictionary data generation section 130. The terminal 100 is, for example, a personal computer, a tablet, or a smartphone, and functions of the sections in the terminal 100 are realized by a hardware configuration of an information processing device to be described later. Specifically, the functions of, for example, the image acquisition section 110, the angle information acquisition section 120, and the dictionary data generation section 130 are realized by a processor included in the information processing device. Dictionary data 210 generated by the dictionary data generation section 130 is stored in the database 200 connected to the terminal 100 via the network. A function of the database 200 is realized by a storage in one or a plurality of information processing devices connected to the network. It is noted that in a case in which the terminal 100 includes a plurality of processors, the plurality of processors may cooperate to realize the functions of the sections described above. Alternatively, a server can realize part of or all of the functions realized by the processors in the terminal 100 as described later. The functions of the sections will be described below.

The image acquisition section 110 acquires the image of the object obj captured by the camera 150. Here, the camera 150 is an example of an imaging device that captures an image of an object. Specifically, the camera 150 is, for example, a digital camera including an image sensor, and the image acquisition section 110 receives image data generated by the camera 150. While the camera 150 is connected to the terminal 100 via a wired communication interface such as a universal serial bus (USB) in an example depicted in FIG. 2, the camera 150 may be connected to the terminal 100 via a wireless communication interface such as a Bluetooth (registered trademark) communication interface in another example. Alternatively, the camera 150 may be incorporated in the terminal 100 and transmit the image data to the image acquisition section 110 via a bus.

The angle information acquisition section 120 acquires the angle information indicating the angle of the object obj from the camera platform device 160. Here, in the present embodiment, the angle information acquired by the angle information acquisition section 120 in the terminal 100 indicates an angle of the object obj with reference to a coordinate system of the camera platform device 160. It is noted that the case in which "the angle information acquisition section 120 acquires the angle information" also includes a case in which the angle information acquisition section 120 generates in itself the angle information regarding the object obj, transmits the angle information to the camera platform device 160, and provides the angle information to the dictionary data generation section 130. In this case, the camera platform device 160 sets an angle at which the object obj is held in accordance with the angle information received from the angle information acquisition section 120. In the present embodiment, the camera platform device 160 is an example of holding means that holds the object obj. Similarly to the camera 150, the camera platform device 160 may be connected to the terminal 100 via a wired communication interface or may be connected to the terminal 100 via a wireless communication interface.

As described above, the angle of the object obj is the angle in the three-dimensional space, for example, the angle represented by the rotation amounts about the three axes in the orthogonal coordinate system. Owing to this, the angle information acquisition section 120 expresses the angle information by, for example, the rotation amounts that correspond to a difference between a current posture of the object obj and the reference posture. Here, the reference posture means, for example, a posture of the object obj when the camera platform device 160 is reset. Alternatively, the reference posture may be a posture of the object obj when the image acquisition section 110 acquires the image of the object obj for the first time for generating the dictionary data 210.

The dictionary data generation section 130 generates the dictionary data 210 on the basis of the image acquired by the image acquisition section 110, the identification information regarding the object obj, and the angle information acquired by the angle information acquisition section 120. Here, the identification information regarding the object obj may be identified by any means. For example, the identification information regarding the object obj may be identified on the basis of information input to the terminal 100 by a user. Alternatively, the identification information regarding the object obj may be identified by performing matching between the image acquired by the image acquisition section 110 and dictionary data separately provided for image-based object recognition. In another alternative, the dictionary data generation section 130 may allocate the identification information to the object obj commonly contained in a plurality of images acquired by the image acquisition section 110.

It is noted that an already known technique related to the image-based object recognition can be utilized as appropriate for a combination between the image and the identification information regarding the object obj among information used for generating the dictionary data 210 in the present embodiment. For example, the dictionary data generation section 130 may extract a feature amount from the image by an appropriate scheme utilized for the image-based object recognition and make the extracted feature amount correspond to the identification information and the angle information regarding the object obj. Alternatively, the dictionary data generation section 130 may utilize, for example, the identification information regarding the object obj classified and labeled by an appropriate scheme utilized for the image-based object recognition.

Furthermore, while it is described in the present embodiment that the dictionary data 210 is generated on the basis of the identification information regarding the object obj, the dictionary data 210 is not necessarily generated on the basis of the identification information regarding the object obj. For example, in a case of providing the system 10 for a single type of object obj, it is unnecessary for the dictionary data 210 to contain the identification information regarding the objects obj. On the other hand, in a case in which the dictionary data 210 contains the identification information regarding the object obj as in the present embodiment, a plurality of types of objects obj are recognized and then the angle of each object obj can be estimated.

(Configurations of Camera Platform Device and Jig)

Configurations of the camera platform device 160 and the jig 170 for mounting the object obj to the camera platform device 160 which are used together with the terminal 100 in the system 10 according to the present embodiment will be further described.

Figure 3:
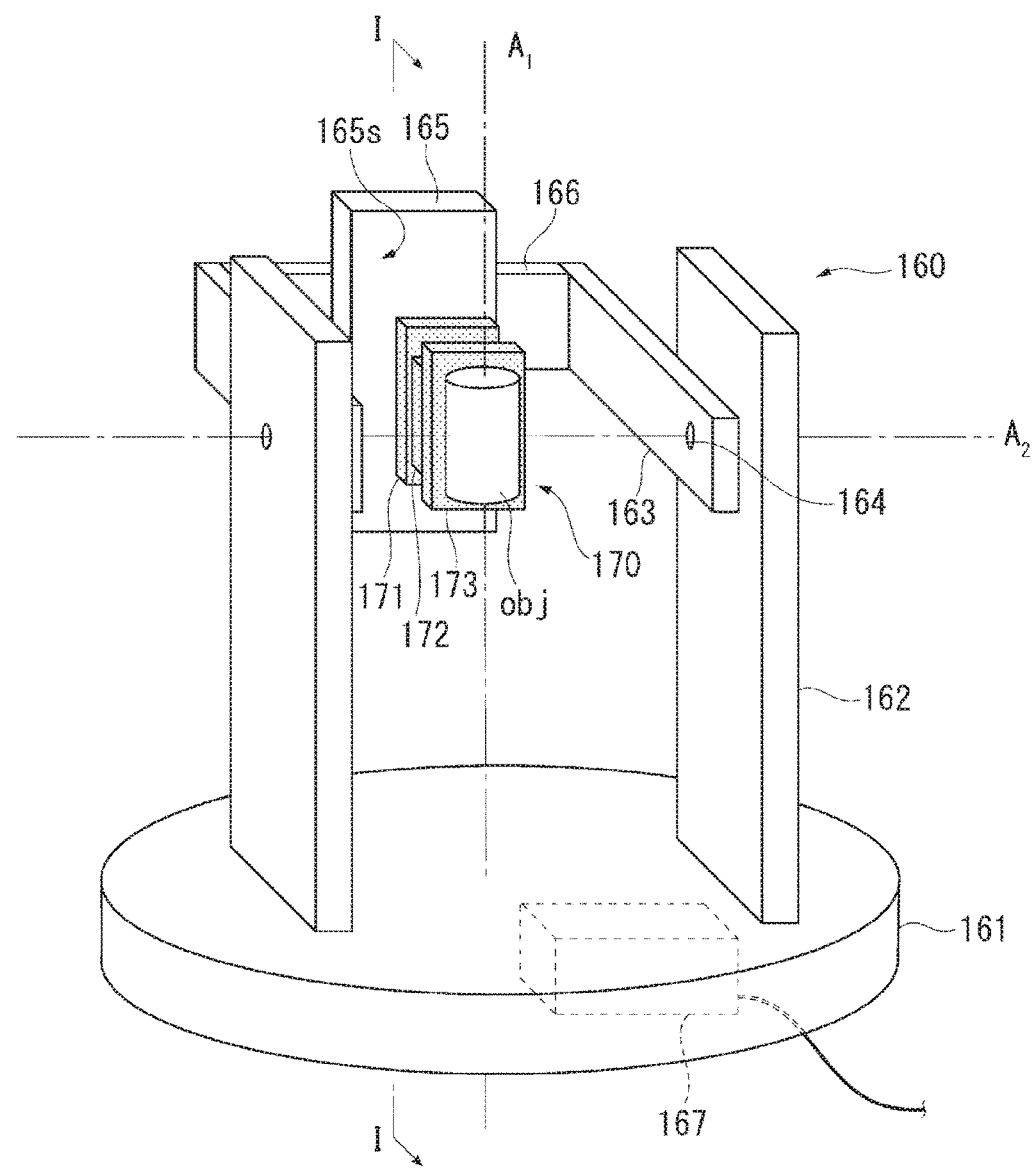
FIG. 3 is a schematic perspective view depicting configurations of a camera platform device and a jig used in the system depicted in FIG. 1.
Figure 4:
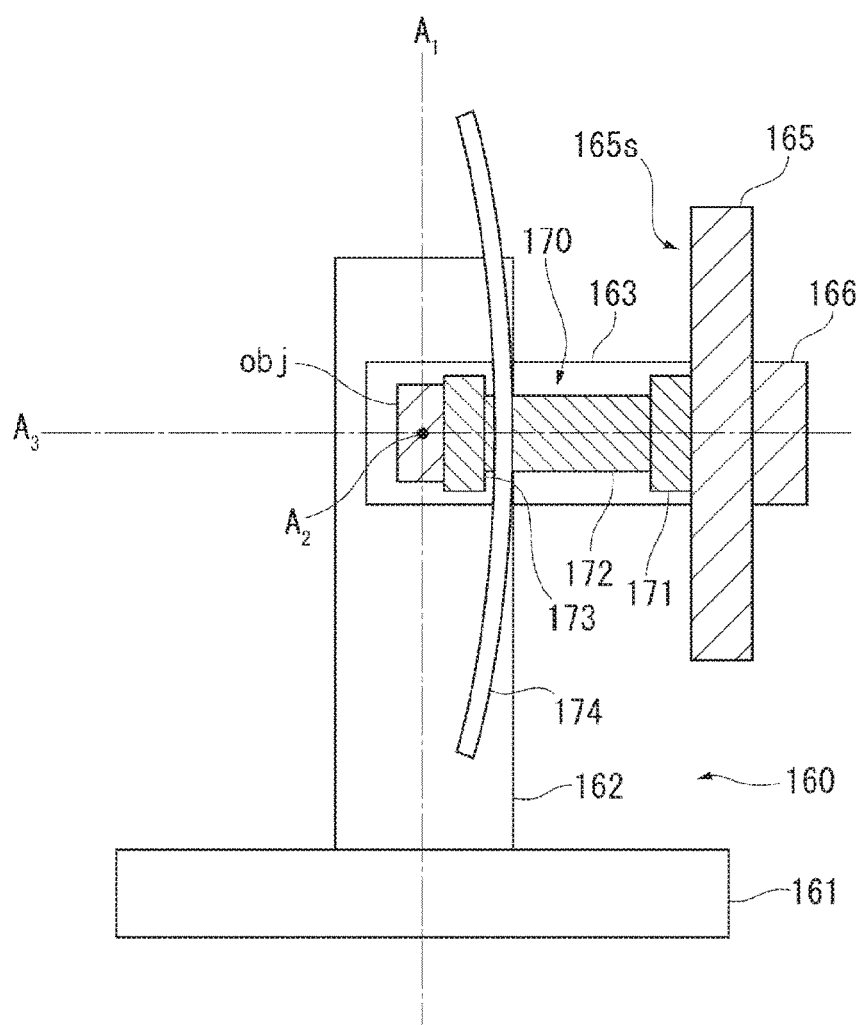
FIG. 4 is a cross-sectional view taken along a line I-I of FIG. 3.

FIG. 3 is a schematic perspective view depicting the configurations of the camera platform device 160 and the jig 170 used in the system depicted in FIG. 1. FIG. 4 is a cross-sectional view taken along line I-I of FIG. 3. With reference to FIGS. 3 and 4, the camera platform device 160 includes a base 161, a pair of struts 162, a pair of arms 163, a pair of pins 164, a holder 165, a beam 166, and a control section 167. The jig 170 includes a mounting member 171, a coupling member 172, an object holder 173, and a background plate 174. It is noted that the background plate 174 is not depicted in FIG. 3. The sections will be described below.

In the camera platform device 160, the base 161 is, for example, a rotary table and is driven by a motor (not depicted) controlled by the control section 167 to rotate about an axis $A_1$. Here, the axis $A_1$ is orthogonal to an optical axis (denoted as an axis $A_3$ in FIG. 4) of the camera 150. The pair of struts 162 are fixed to positions symmetrical about the axis $A_1$ on the base 161. Therefore, a midpoint of the pair of struts 162 is substantially coincident with the axis $A_1$. The pair of arms 163 are coupled to the pair of struts 162 using the pins 164, respectively, on a side opposite to the base 161. The pins 164 are located on an axis $A_2$ orthogonal to the axis $A_1$. The pair of arms 163 are pivotally movable about the axis $A_2$. Specifically, the pair of struts 162 and the pins 164 are coupled to one another or the pins 164 and the pair of arms 163 are coupled to one another via gears, and a motor (not depicted) controlled by the control section 167 is connected to the gears, whereby the pair of arms 163 pivotally move about the axis $A_2$.

The holder 165 is fixed between end portions of the pair of arms 163 via the beam 166 on a side opposite to the pair of struts 162. While the holder 165 is a member to which a camera is mounted in a case, for example, in which the camera platform device 160 is used as an automatic camera platform for the camera, the mounting member 171 of the jig 170 is mounted to the holder 165 in the present embodiment as described later. When the pair of arms 163 pivotally move about the axis $A_2$ as described above, the holder 165 revolves about the axis $A_2$. In this case, while the holder 165 revolves about the axis $A_2$ by the configuration of the pair of arms 163 described above, a mounting surface 165s of the holder 165 is kept in a state of facing the axis $A_2$.

The control section 167 is, for example, a microcontroller incorporated in the camera platform device 160, and controls the rotation of the base 161 and the pivotal movement of the pair of arms 163 by controlling the motor as described above. The control section 167 controls the motor in accordance with, for example, a preset procedure or an instruction from the terminal 100. In this way, the control section 167 sets an angle by which the base 161 rotates about the axis $A_1$ and an angle by which the pair of arms 163 pivotally move about the axis $A_2$. The angle information acquisition section 120 in the terminal 100 acquires, for example, information indicating set values of the angles by the control section 167 described above as the angle information.

Originally, the camera platform device 160 described so far is commercially distributed as a device that automates panning (rotation about the axis $A_1$) and tilting (revolution about the axis $A_2$) of the camera mounted to the holder 165. In the present embodiment, it is intended to efficiently generate the dictionary data 210 that completely covers various angles by automating the setting of the angle of the object obj utilizing such a camera platform device 160. However, in a case of directly mounting the object obj to the holder 165 of the camera platform device 160, pivotally movement of the pair of arms 163 causes the holder 165 to revolve about the axis $A_2$ and results in a large deviation of a position of the object obj from the optical axis (denoted as the axis $A_3$ in FIG. 4) of the camera 150. To address the problem, the object obj is mounted to the camera platform device 160 via the jig 170 to be described below in the present embodiment.

In the jig 170, the mounting member 171 is a member that can be mounted to the holder 165 of the camera platform device 160. For example, a mounting structure corresponding to a structure provided in the holder 165 for fixing the camera is provided in the mounting member 171. Specifically, in a case of providing a screw in the holder 165 for fixing the camera, a screw hole is provided in the mounting member 171. Alternatively, a mounting structure available regardless of the structure of the holder 165 may be provided in the mounting member 171. Specifically, a clip sandwiching the holder 165, a belt wound around the holder 165, or the like may be provided in the mounting member 171.

The object holder 173 is a member to which the object obj can be mounted. For example, a mounting structure that can fix the object obj while making a contact area of the mounting structure with the object obj as small as possible is provided in the object holder 173. This is because the contact area between the mounting structure and the object obj can act as an occlusion region in the image of the object obj captured by the camera 150. Specifically, a clip sandwiching the object obj, a hook gripping the object obj, an adhesive surface to which the object obj is adhesively attached, or the like may be provided in the object holder 173. Furthermore, a magnet may be provided in the object holder 173 for the object obj that is a magnetic material.

The coupling member 172 couples the mounting member 171 to the object holder 173. Furthermore, the coupling member 172 specifies a position relationship between the mounting member 171 and the object holder 173 so that the object obj mounted to the object holder 173 is located near an intersecting point between the axes $A_1$ and $A_2$ when the mounting member 171 is mounted to the holder 165 of the camera platform device 160. For example, the coupling member 172 is coupled to the mounting member 171 so that the coupling member 172 extends along the pair of arms 163 when the mounting member 171 is mounted to the holder 165. At this time, a length of the coupling member 172 along the pair of arms 163 is nearly equal to a value obtained by subtracting thicknesses of the mounting member 171 and the object holder 173 and a half of a thickness of the object obj from a distance between the holder 165 and the axis $A_2$. The coupling member 172 may have a structure that makes adjustable the length thereof in the direction along the arms 163. It is thereby possible to adjust the length of the coupling member 172 in accordance with a size of the object obj and to make a center of the object obj close to the intersecting point between the axes $A_1$ and $A_2$.

The object obj mounted to the camera platform device 160 via the jig 170 as described above is located near the intersecting point between the axes $A_1$ and $A_2$. Owing to this, even when the base 161 of the camera platform device 160 rotates about the axis $A_1$ or even when the pair of arms 163 pivotally move about the axis $A_2$, the position of the object obj hardly changes and does not largely deviate from the optical axis (denoted as the axis $A_3$ in FIG. 4) of the camera 150. In the present embodiment, therefore, when the control section 167 of the camera platform device 160 sets the angle by which the base 161 rotates about the axis $A_1$ and the angle by which the pair of arms 163 pivotally move about the axis $A_2$, these angles can be regarded as the rotation amounts of the object obj about the axes $A_1$ and $A_2$.

In a case of using the camera platform device 160 and the jig 170 described above, the object obj cannot be rotated about the axis $A_3$ orthogonal to the axes $A_1$ and $A_2$, that is, about the optical axis of the camera 150 but the rotation about the axis $A_3$ can be accurately complemented by subjecting the image captured by the camera 150 to plane rotation. Furthermore, while it is described above that the object obj is on the optical axis of the camera 150 for the brevity, the object obj is not necessarily on the optical axis of the camera 150.

The background plate 174 is mounted to the coupling member 172 or the object holder 173 and provides a background of the object obj. For example, a mounting structure for selectively mounting a screen may be provided in the background plate 174. The screen can include, for example, a plurality of screens formed from different materials. The materials can include, for example, paper, a cloth, and a film. Moreover, the screen may include a plurality of screens having different colors or different reflection characteristics. Replacing the screen makes it possible to replaceably provide a plurality of backgrounds of the object obj different in material, color, reflection characteristics, or the like. Alternatively, the background plate 174 may be mounted, for example, detachably to the coupling member 172 or the object holder 173. In this case, selectively mounting the plurality of background plates 174 makes it possible to replaceably provide a plurality of backgrounds of the object obj different in material, color, reflection characteristics, or the like. Specifically, the background plate 174 can include, for example, a plurality of background plates 174 having surfaces that face the object obj and that are formed from different materials. The materials can include, for example, paper, a cloth, and a film. Moreover, the background plate 174 may include a plurality of background plates 174 having surfaces that face the object obj and that differ in color or reflection characteristics.

(Conceptual Description of Dictionary Data)

Figure 5:
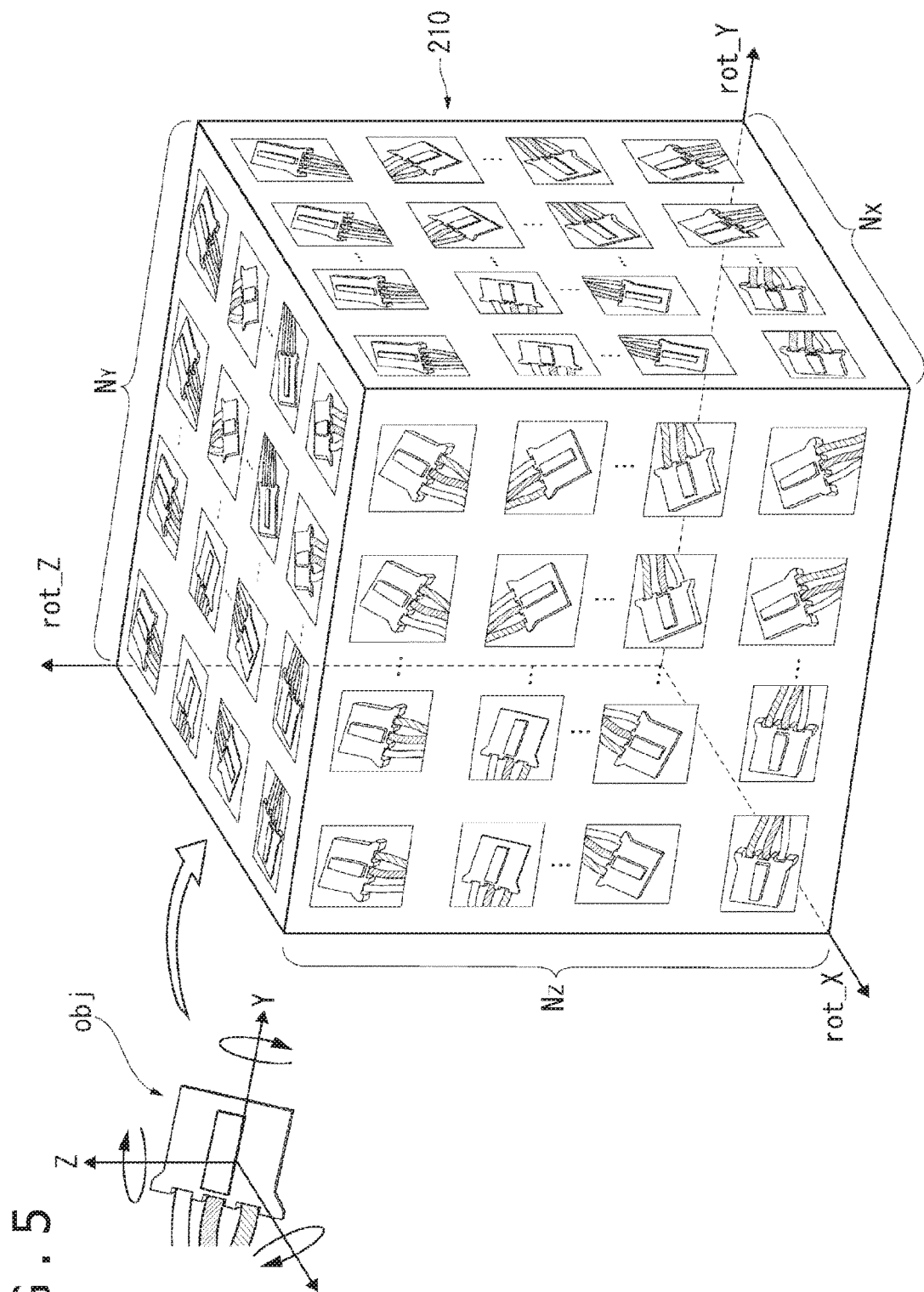
FIG. 5 is a conceptually explanatory diagram of dictionary data generated in the first embodiment of the present invention.

FIG. 5 is a conceptually explanatory diagram of the dictionary data generated in the first embodiment of the present invention. FIG. 5 exemplarily depicts the dictionary data 210 made to correspond to the object obj (connector in an example depicted in FIG. 5) identified by certain identification information. In the example depicted in FIG. 5, an angle of the object obj is a vector quantity represented by the rotation amounts about three axes (X-axis, Y-axis, and Z-axis) of the orthogonal coordinate system in the three-dimensional space. The dictionary data 210 includes, for the angle of the object obj, at least $N_X \times N_Y \times N_Z$ elements defined by splitting a perimeter into $N_X$ elements for a rotation amount (rot_X) about the X-axis, splitting the perimeter into $N_Y$ elements for a rotation amount (rot_Y) about the Y-axis, and splitting the perimeter into $N_Z$ elements for a rotation amount (rot_Z) about the Z-axis. Each element is made to correspond to information corresponding to at least one image of the object obj. Here, the information corresponding to the image of the object obj can be a feature amount extracted from the image captured by the camera 150 when the angle of the object obj is, for example, represented by the rotation amounts (rot_X, rot_Y, rot_Z).

In the above example, split widths of the rotation amounts (rot_X, rot_Y, rot_Z) about the axes may differ (that is, at least any of $N_X$, $N_Y$, and $N_Z$ may differ from the others). Furthermore, the rotation amounts are not necessarily equally split. For example, in a case of the presence of an angle difficult to estimate with high reliability in estimating the angle of the object obj to be described later, the split width of the rotation amounts near the rotation amount corresponding to the angle may be set smaller than those of the other parts.

For example, in a case in which the camera 310 of the robot 300 captures an image of the object obj at an unknown angle, the angle of the object obj can be estimated by conducting matching between a feature amount extracted from the captured image and a feature amount made to correspond to the element in the dictionary data 210.

Here, the dictionary data 210 may include a plurality of elements generated on the basis of angle information regarding the same object obj and a plurality of different images of the same object obj. In this case, the number of elements in the dictionary data 210 is more than $N_X \times N_Y \times N_Z$. The plurality of images made to correspond to the same angle information may have, for example, different environmental conditions at a time of capture. The environmental condition can be, for example, a background or a light placement. Generating the dictionary data 210 on a plurality of different environmental conditions makes it possible to provide the dictionary data 210 with which it is possible to estimate the angle of the object obj on various environmental conditions.

In the above case, the image acquisition section 110 in the terminal 100 acquires a plurality of different images of the object obj. For example, the image acquisition section 110 may acquire images of the object obj when the control section 167 of the camera platform device 160 sets the same angle before and after replacement of the background of the object obj using the background plate 174 of the jig 170. In this case, the dictionary data generation section 130 generates a plurality of elements in the dictionary data 210 on the basis of a plurality of images having different backgrounds, identification information regarding the object obj common to the plurality of images, and angle information indicating the angle of the object obj common to the plurality of images.

(Configuration of Robot)

Figure 6:
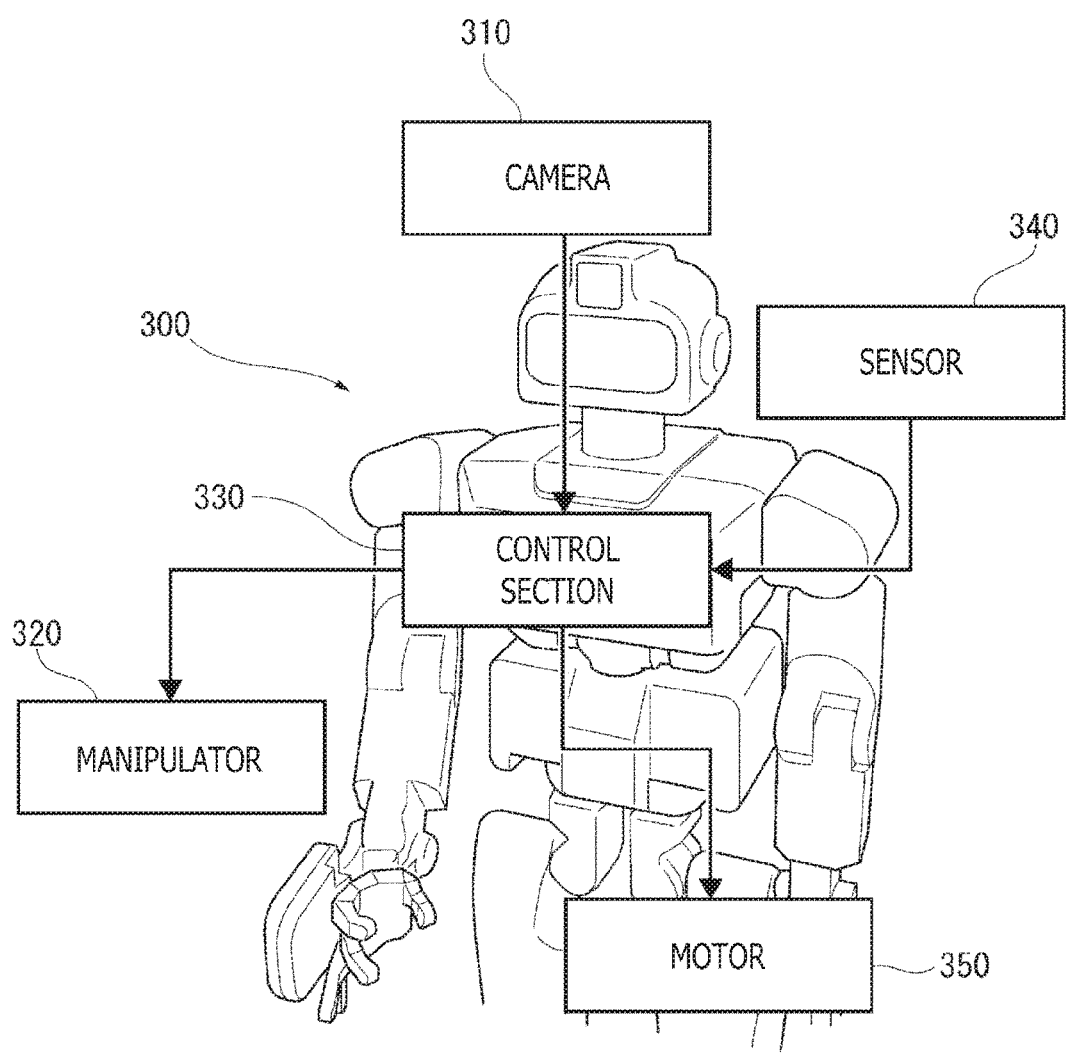
FIG. 6 is an explanatory diagram of a schematic configuration of a robot in the system depicted in FIG. 1.

FIG. 6 is an explanatory diagram of a schematic configuration of the robot 300 in the system depicted in FIG. 1. With reference to FIG. 6, the robot 300 includes the camera 310, the manipulator 320, a control section 330, a sensor 340, and a motor 350. The robot 300 can grip the object obj using, for example, the manipulator 320 under control of the control section 330, and capture the image of the object obj using the camera 310. In the present embodiment, the manipulator 320 is an example of holding means that holds the object obj similarly to the camera platform device 160 described above. The control section 330 is realized by, for example, the hardware configuration of the information processing device to be described later.

The sensor 340 includes a sensor for acquiring various measurement values used in the robot 300 or transmitted from the robot 300 to the other device. Specifically, the sensor 340 may include, for example, an acceleration sensor, an angular velocity sensor, a geomagnetic sensor, and/or a global navigation satellite system (GNSS) receiver. Furthermore, the sensor 340 may include a depth sensor or a laser range scanner such as a laser imaging detection and ranging (LIDAR).

The motor 350 actuates the sections in the robot 300 under control of the control section 330. The motor 350 can include, for example, a motor (actuator) for changing a posture of the robot 300 or moving the robot 300 by actuating a joint structure (not depicted). Furthermore, the motor 350 may include a motor for rotating wheels and moving the robot 300. It is noted that the sections including the motor 350 in the robot 300 can be configured appropriately on the basis of an already known robot design scheme. Here, the robot 300 does not necessarily change the posture or move. Likewise, the robot 300 does not necessarily include the joint structure (other than the manipulator 320) or the wheels.

(Configuration for Estimating Angle of Object)

Figure 7:
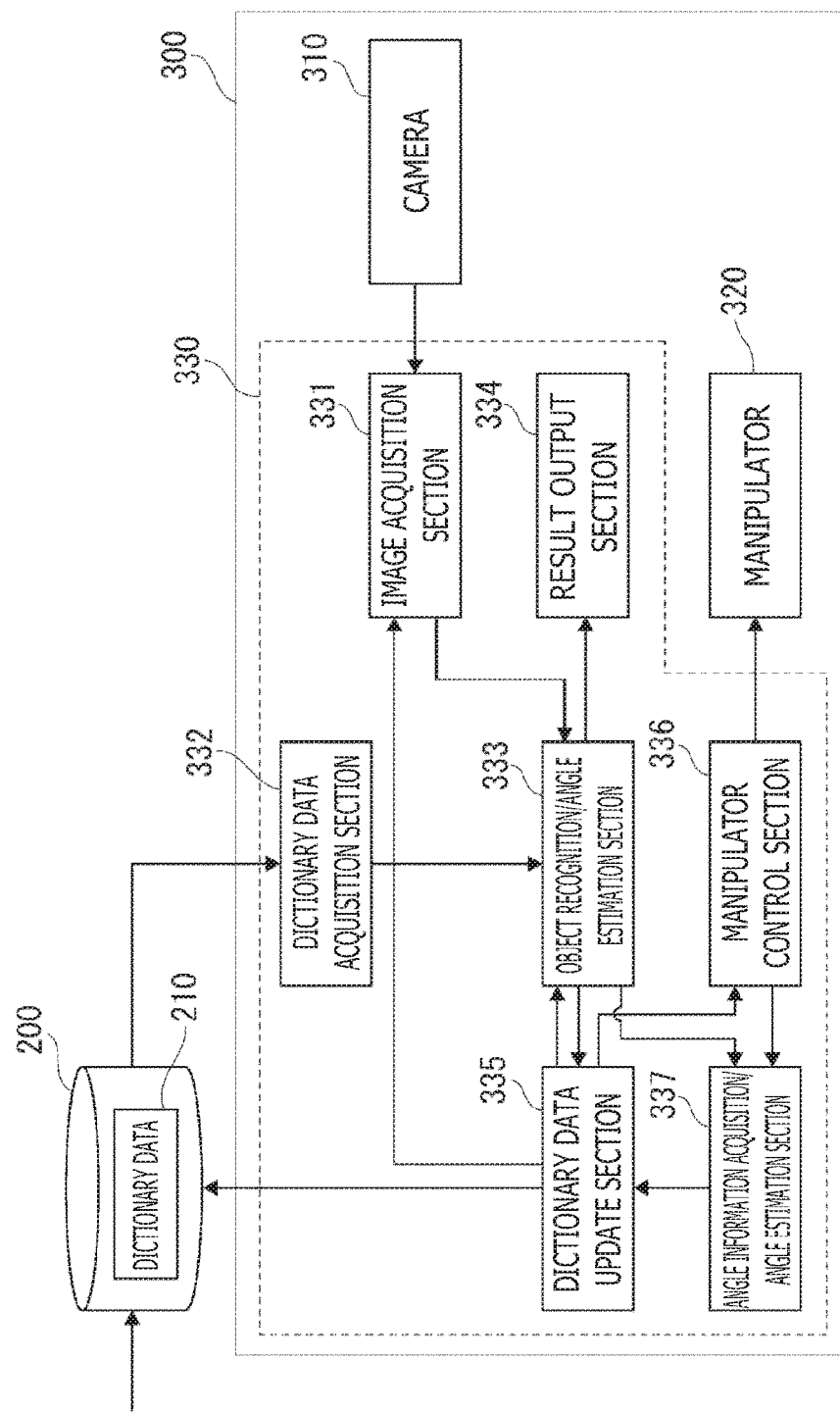
FIG. 7 is a block diagram depicting a functional configuration of the robot in the system depicted in FIG. 1.

FIG. 7 is a block diagram depicting a functional configuration of the robot 300 in the system depicted in FIG. 1. With reference to FIG. 7, the robot 300 includes not only the camera 310 and the manipulator 320 but also an image acquisition section 331, a dictionary data acquisition section 332, an object recognition/angle estimation section 333, a result output section 334, a dictionary data update section 335, a manipulator control section 336, and an angle information acquisition/angle estimation section 337. The sections other than the camera 310 and the manipulator 320 are realized by, for example, the processor in the information processing device that realizes the control section 330 of the robot 300 described above. It is noted that in a case in which the control section 330 includes a plurality of processors, the plurality of processors may cooperate to realize the functions of the sections described above. Alternatively, a server can realize part of or all of the functions realized by the processors in the control section 330 as described later. The functions of the sections will be described below. It is noted that a function related to update of the dictionary data will be described later in detail with reference to flowcharts and is, therefore, described herein briefly.

The image acquisition section 331 acquires the image of the object obj captured by the camera 310. In the present embodiment, the camera 310 is an example of an imaging device that captures an image of an object similarly to the camera 150 described above. The image captured by the camera 150 and that captured by the camera 310 differ from each other although the images contain the object obj of the same type. Specifically, the camera 310 is, for example, a digital camera including an image sensor and the image acquisition section 331 receives image data generated by the camera 310. For example, the robot 300 grips the object obj using the manipulator 320. In this case, the image acquired by the image acquisition section 331 contains the object obj gripped by the manipulator 320. Alternatively, the image acquisition section 331 may contain the object obj that is not gripped by the manipulator 320 but that is placed on a table, a floor, or the like. While the camera 310 is incorporated in the robot 300 and transmits the image data to the image acquisition section 331 via a bus in the example depicted in FIG. 7, the camera 310 may be externally connected to the robot 300 via a wired communication interface or a wireless communication interface.

The dictionary data acquisition section 332 acquires the dictionary data 210 from the database 200 connected to the robot 300 via the network. As described above, the dictionary data 210 is generated on the basis of the image of the object obj and the angle information regarding the object obj (as well as the identification information regarding the object obj). The robot 300 utilizes the dictionary data 210 to estimate the angle of the object obj gripped by the manipulator 320. It is noted that the dictionary data acquisition section 332 does not necessarily acquire the entire dictionary data 210. For example, in a case in which the dictionary data 210 is generated for a plurality of types of objects and the object obj contained in the image acquired by the image acquisition section 331 is already identified, the dictionary data acquisition section 332 selectively acquires an element made to correspond to the identification information regarding the object obj in the dictionary data 210.

The object recognition/angle estimation section 333 estimates the angle of the object obj in the image on the basis of the image of the object obj acquired by the image acquisition section 331 and the dictionary data 210 acquired by the dictionary data acquisition section 332. In a case in which the dictionary data 210 is generated for a plurality of types of objects and the object obj contained in the image acquired by the image acquisition section 331 is not identified, the object recognition/angle estimation section 333 identifies the identification information regarding the object obj by image-based object recognition. Since the already known technique can be applied to the image-based object recognition, the image-based object recognition will not be described in detail. For example, in a case in which the dictionary data 210 is generated for a single type of object or the object obj contained in the image acquired by the image acquisition section 331 is already identified, the object recognition/angle estimation section 333 does not execute object recognition.

On the other hand, the object recognition/angle estimation section 333 executes estimation of the angle of the object obj by, for example, performing matching between the image acquired by the image acquisition section 331 and an element in the dictionary data 210. In this case, the angle made to correspond to the element having a highest matching score in the dictionary data 210 is estimated as the angle of the object obj in the image. As described later, the dictionary data 210 for estimating the angle of the object obj can include many elements. Thus, the object recognition/angle estimation section 333 may prunes the dictionary data 210 on the basis of the image acquired by the image acquisition section 331 and execute matching between the pruned dictionary data 210 and the image. In the present embodiment, pruning is a process for determining the dictionary data 210 not to be subjected to matching by a process lighter in processing load than the matching for estimating the angle of the object obj.

The result output section 334 outputs a result of recognition by the object recognition/angle estimation section 333. As described above, while the robot 300 may utilize the estimation result of the angle of the object obj for operations of the robot 300 in itself, for example, for control over the manipulator 320, the robot 300 may output the estimation result in a format of some sort as needed. More specifically, the estimation result may be displayed as an image on a display of the robot 300 or output as a sound from a loudspeaker. Furthermore, the estimation result may be further transmitted to another device from a communication device owned by the robot 300 via the network. The result output section 334 controls output of the estimation result described above. In a case of no need to output the estimation result, the result output section 334 is not provided.

The dictionary data update section 335 updates the dictionary data 210 in response to the estimation result of the angle of the object obj by the object recognition/angle estimation section 333 and a result of re-estimation of the angle by the angle information acquisition/angle estimation section 337 to be described later. More specifically, in a case in which the reliability of the angle estimated by the object recognition/angle estimation section 333 does not exceed a threshold, the dictionary data update section 335 updates the dictionary data 210 on the basis of the result of the re-estimation of the angle by the angle information acquisition/angle estimation section 337. It is noted that an angle estimation function by the object recognition/angle estimation section 333 will be also referred to as "first angle estimation function," and that an angle re-estimation function by the angle information acquisition/angle estimation section 337 will be also referred to as "second angle estimation function" in the following description. These angle estimation functions are not necessarily carried out independently of each other. For example, the angle information acquisition/angle estimation section 337 utilizes the estimation result of the angle by the object recognition/angle estimation section 333 in re-estimating the angle. In other words, the "first angle estimation function" is often executed solely and the "second angle estimation function" often calls the "first angle estimation function."

The manipulator control section 336 controls the manipulator 320 gripping the object obj in the robot 300. When the dictionary data update section 335 executes the update of the dictionary data 210, the manipulator control section 336 rotates the object obj by controlling the manipulator 320. It is noted that rotation mentioned herein means a change in the angle of the object obj. The rotation of the object obj is an example of a physical operation related to the object obj and executed in re-estimating the angle of the object obj.

The angle information acquisition/angle estimation section 337 acquires angle information indicating the angle of the object obj from the manipulator control section 336. Here, in the present embodiment, the angle information acquired by the angle information acquisition/angle estimation section 337 in the robot 300 indicates the angle of the object obj based on a coordinate system of the robot 300 or the manipulator 320. In the present embodiment, therefore, the angle information acquired from the manipulator control section 336 is not necessarily made to directly correspond to the angle information in the dictionary data 210. Thus, in the present embodiment, the angle information acquisition/angle estimation section 337 calculates a rotation amount $\Delta\theta$ of the object obj from the angle information before and after the rotation of the object obj by control by the manipulator control section 336 over the manipulator 320, and utilizes the rotation amount $\Delta\theta$ in re-estimation of the angle to be described later.

Furthermore, the angle information acquisition/angle estimation section 337 re-estimates an angle $\theta_1$ (simply represented as $\theta_1 = \theta_2 - \Delta\theta$) of the object obj in an image (first image) before the rotation of the object obj, on the basis of an angle $\theta_2$ of the object obj, which is estimated by the object recognition/angle estimation section 333 on the basis of an image (second image) after the rotation of the object obj and the dictionary data 210, and on the basis of the rotation amount $\Delta\theta$. Here, the rotation amount $\Delta\theta$ is an example of an amount of the physical operation related to the object obj. It is noted that each of the angle $\theta_1$, the angle $\theta_2$, and the rotation amount $\Delta\theta$ can be a vector quantity containing, for example, elements of rotations (rot_X, rot_Y, rot_Z in the example of FIG. 5) about the axes of the coordinate system.

In a case in which the reliability of the angle $\theta_2$ of the object obj estimated by the object recognition/angle estimation section 333 on the basis of the image (second image) after the rotation of the object obj and the dictionary data 210 exceeds the threshold, the dictionary data update section 335 updates the dictionary data 210 on the basis of the angle information indicating the angle $\theta_1$, which is re-estimated by the angle information acquisition/angle estimation section 337 on the basis of this, and the image (first image) before the rotation of the object obj.

On the other hand, in a case in which the reliability of the angle $\theta_2$ estimated by the object recognition/angle estimation section 333 on the basis of the image (second image) after the rotation of the object obj and the dictionary data 210 does not exceed the threshold, then the manipulator control section 336 controls the manipulator 320 to further rotate the object obj by a rotation amount $\Delta\theta'$, and the object recognition/angle estimation section 333 estimates an angle $\theta_3$ of the object obj on the basis of an image (third image) after the rotation of the object obj and the dictionary data 210. In a case in which the reliability of the angle $\theta_3$ exceeds the threshold, then the angle information acquisition/angle estimation section 337 re-estimates the angle $\theta_1$ on the basis of the angle $\theta_3$ and a total rotation amount ($\Delta\theta+\Delta\theta'$), and the dictionary data update section 335 updates the dictionary data 210 on the basis of this result.

In this way, the dictionary data update section 335 updates the dictionary data 210 on the basis of the angle $\theta_1$ and the image (first image) before the rotation of the object obj upon re-estimation of the angle $\theta_1$ with the sufficient reliability. Specifically, the dictionary data update section 335 adds an element to the dictionary data 210 or substitutes an element for an element in the dictionary data 210. This increases a probability that the angle $\theta_1$ can be estimated with high reliability without depending on the re-estimation when the camera 310 subsequently captures an image of the object obj at the angle $\theta_1$ on a similar environmental condition.

(Example of Process Flows)

An example of process flows in the system 10 according to the present embodiment will be described below with reference to FIGS. 8 to 12.

Figure 8:
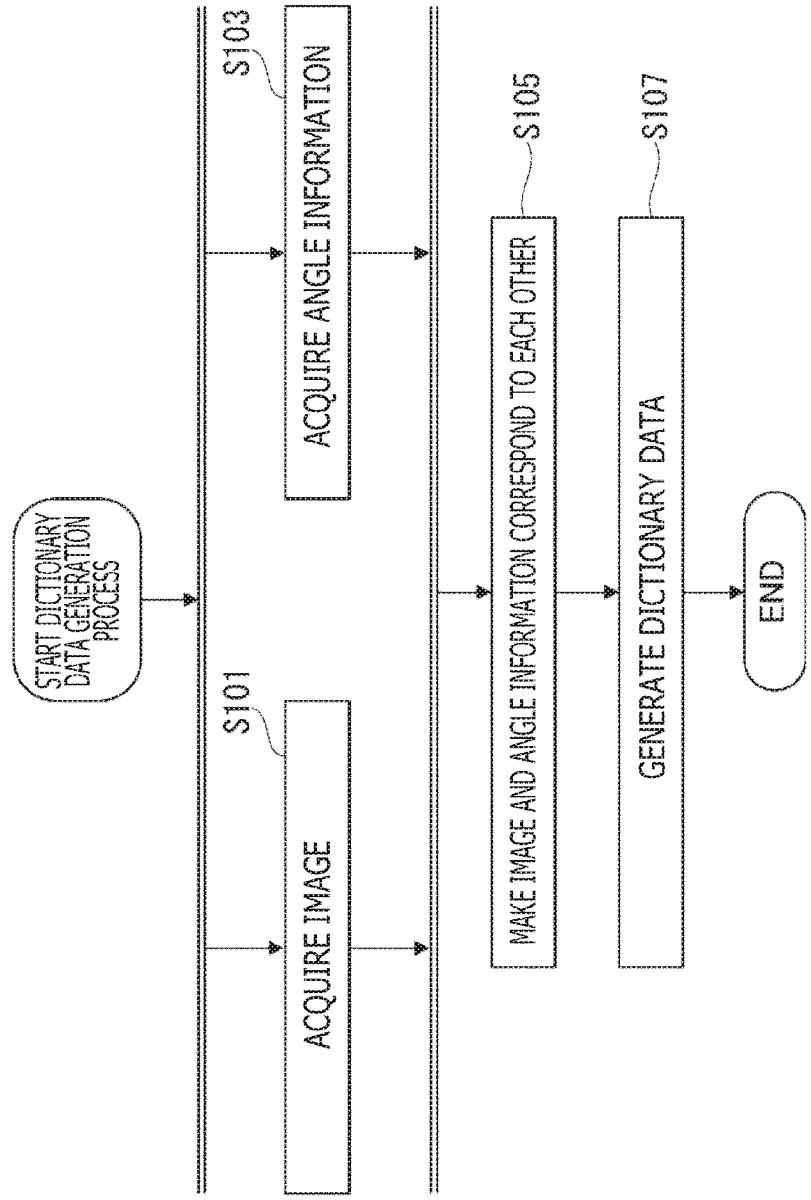
FIG. 8 is a flowchart depicting an example of a dictionary data generation process in the first embodiment of the present invention.

FIG. 8 is a flowchart depicting an example of a dictionary data generation process in the first embodiment of the present invention. With reference to FIG. 8, in a registration process, first, the image acquisition section 110 in the terminal 100 acquires an image (Step S101) and the angle information acquisition section 120 acquires angle information (Step S103). Any of Steps S101 and S103 may be executed earlier or Steps S101 and S103 may be executed in parallel. For example, the angle information acquisition section 120 may acquire the angle information from the camera platform device 160 with the acquisition of the image captured by the camera 150 by the image acquisition section 110 in real time as a trigger. Alternatively, the image acquisition section 110 may acquire the image captured by the camera 150 in real time with the transmission of the angle information to the camera platform device 160 by the angle information acquisition section 120 as a trigger. In another alternative, the image acquisition section 110 may consecutively acquire images captured by the camera 150 in time series and the angle information acquisition section 120 may consecutively acquire angle information set to the camera platform device 160 in time series.

Next, the dictionary data generation section 130 in the terminal 100 makes the image acquired in Step S101 and the angle information acquired in Step S103 correspond to each other. For example, in a case in which both the image and the angle information are acquired in real time, the dictionary data generation section 130 makes the image and the angle information acquired substantially simultaneously correspond to each other. On the other hand, in a case in which the image and the angle information are acquired at different times or later, the dictionary data generation section 130 makes the image and the angle information having a common key correspond to each other. The key in this case may be, for example, a time stamp or may be a sequence number assigned separately from the time stamp.

Next, the dictionary data generation section 130 generates the dictionary data 210 on the basis of the image and the angle information made to correspond to each other in Step S105 (Step S107). Here, as already described, the dictionary data generation section 130 may generate the dictionary data 210 by applying the already known image-based object recognition technique. Furthermore, in a case, for example, in which pairs of substantially same images and substantially same angle information are acquired consecutively, the dictionary data generation section 130 may determine that the acquired images and angle information as redundant information and omit generation of the dictionary data 210.

Figure 9:
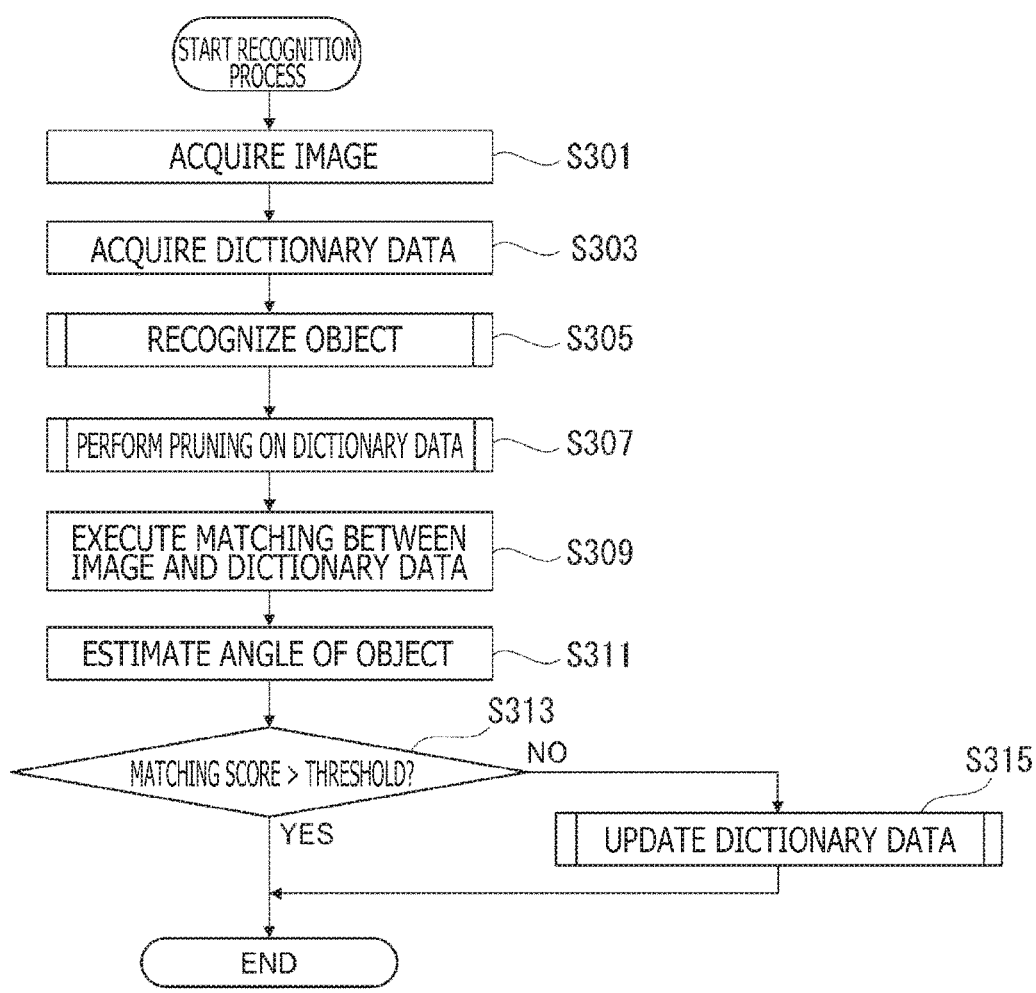
FIG. 9 is a flowchart depicting an example of a recognition process in the first embodiment of the present invention.

FIG. 9 is a flowchart depicting an example of a recognition process in the first embodiment of the present invention. With reference to FIG. 9, in the recognition process, first, the image acquisition section 331 in the robot 300 acquires an image (Step S301). As described above, the image acquisition section 331 acquires the image captured by the camera 310 and this image contains, for example, the object obj gripped by the manipulator 320. Next, the dictionary data acquisition section 332 acquires the dictionary data 210 from the database 200 (Step S303).

Next, the object recognition/angle estimation section 333 recognizes the object obj on the basis of the image acquired in Step S301 and the dictionary data 210 acquired in Step S303 (Step S305). It is noted that the image-based object recognition will not be described in detail since the already known technique can be applied to the image-based object recognition. Furthermore, in the case, for example, in which the dictionary data 210 is generated for a single type of object or in which the object obj contained in the image is already identified as described above, the object recognition in Step S305 is omitted.

Next, the object recognition/angle estimation section 333 executes pruning of the dictionary data 210 (Step S307). For example, in a case of generating the dictionary data 210 depicted in FIG. 5 by splitting the perimeter into 52 for the rotation amounts (rot_X, rot_Y, rot_Z) about the axes (that is, $N_X=N_Y=N_Z=52$), the dictionary data 210 having at least $52^3=140,608$ elements is generated. In a case of generating the dictionary data 210 by making a plurality of different images correspond to the same angle as described above, the number of elements further increases. Since a processing load for executing matching for all the elements in such dictionary data 210 is quite heavy, an advantage of the pruning of the dictionary data 210 is high.

Figure 10:
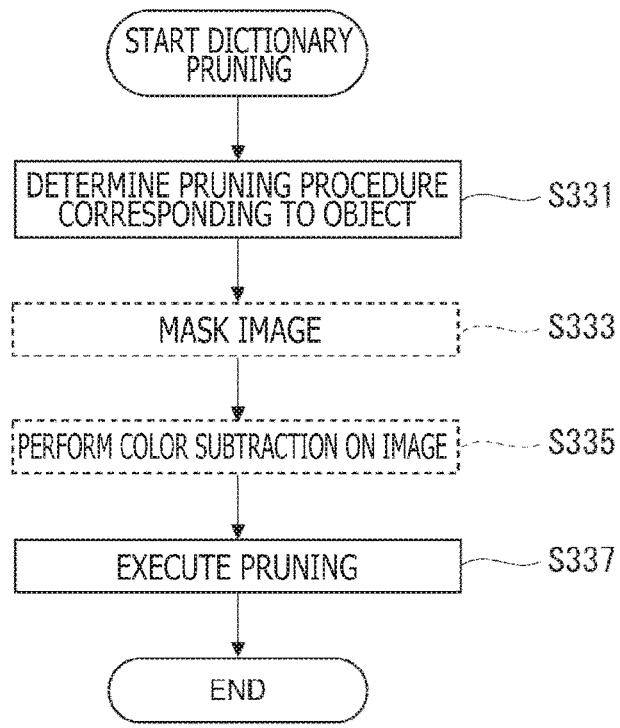
FIG. 10 is a flowchart depicting an example of a pruning process in the first embodiment of the present invention.
Figure 11:
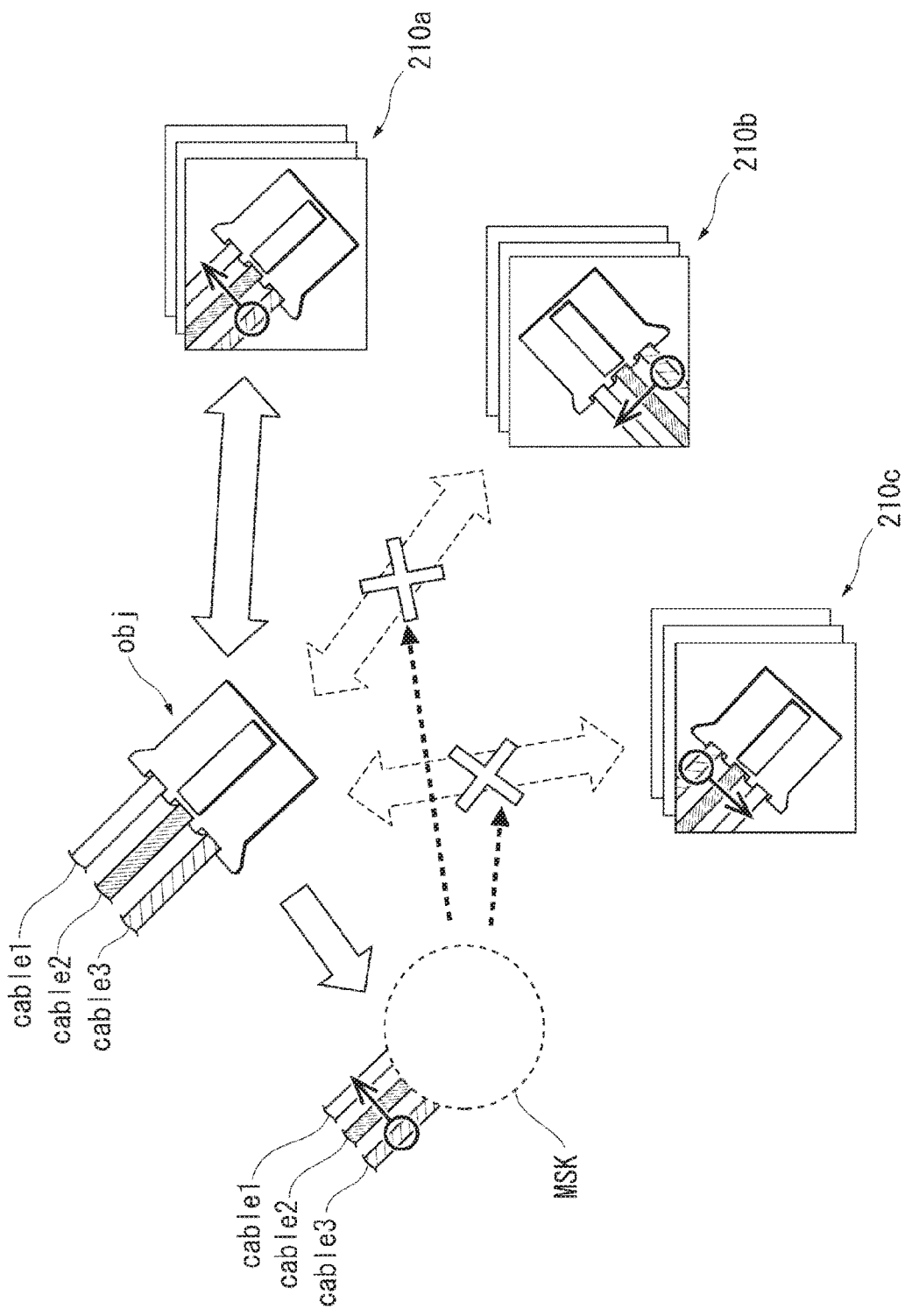
FIG. 11 is a conceptually explanatory diagram of the pruning process depicted in FIG. 10.

FIG. 10 is a flowchart depicting an example of a pruning process in the first embodiment of the present invention. FIG. 11 is a conceptually explanatory diagram of the pruning process depicted in FIG. 10. With reference to FIG. 10, the object recognition/angle estimation section 333 first determines a pruning procedure corresponding to the object obj (Step S331). The pruning procedure corresponding to the object obj is, for example, determined in advance and the pruning procedure together with the dictionary data 210 is stored in the database 200. In a case of executing Step S305 depicted in FIG. 9 described above, the object recognition/angle estimation section 333 determines the pruning procedure in accordance with an object recognition result in Step S305.

Subsequent Steps S333 and S335 are an example of processes executed in accordance with the pruning procedure corresponding to the object in an example depicted in FIG. 11. The processes to be executed can vary depending on the type of object. In the above example, the object recognition/angle estimation section 333 masks the image (Step S333) and furthermore performs color subtraction on the image (Step S335). Next, the object recognition/angle estimation section 333 executes pruning (Step S337). In the example depicted in FIG. 11, for example, a plurality of feature portions are extracted from the image which has been masked and subjected to the color subtraction, and the elements that do not have a position relationship of the plurality of similarly extracted feature portions common to the image are excluded from matching targets among the dictionary data 210.

In the example depicted in FIG. 11, the object obj is connectors. In the example depicted therein, a pruning procedure that pays attention to colors of cables (cable 1 to cable 3) is set. In Step S333 depicted in FIG. 10, portions other than the cables in the image are masked (mask is denoted as MSK in FIG. 11). This eliminates an influence of a shadow of a terminal cover present in the masked portions. Furthermore, although not expressed in FIG. 10, the image is subjected to the color subtraction in Step S335 on condition that a color difference between the cables on two sides (cable 1 and cable 3) can be expressed. This can facilitate extracting the cables (cable 1 and cable 3) on the two ends as two feature portions from the image and each element in the dictionary data 210.

Moreover, in Step S337 depicted in FIG. 10, pruning of the dictionary data 210 is executed on the basis of the image which has been masked and subjected to the color subtraction. Specifically, cable 1, for example, is located upper right in a view from cable 3. On the other hand, in an element group 210b (in which the connectors rotate about a point-of-view axis) in the dictionary data 210, cable 1 is located upper left in a view from cable 3. Furthermore, in an element group 210c (in which the connectors are turned inside out), cable 1 is located lower left in a view from cable 3. In Step S337, therefore, the element groups 210b and 210c are excluded from the matching targets. As a result, the matching is executed with only an element group 210a (in which cable 1 is located upper right in a view from cable 1 similarly to the image) set as targets.

With reference back to FIG. 9, after pruning of the dictionary data 210 in Step S307, the object recognition/angle estimation section 333 executes matching between the image and the dictionary data 210 (Step S309). The matching can be, for example, template matching. It is noted that image matching will not be described in detail since the already known technique can be applied to the matching. While a score of each object is calculated as a result of the matching in the already known image-based object recognition, a score of each angle of the object is calculated in Step S307.

Next, the object recognition/angle estimation section 333 estimates the angle of the object obj on the basis of the result of the matching in Step S309 (Step S311). An estimation result in Step S311 can be, for example, an angle indicated by the angle information made to correspond to an element for which a highest score is calculated in the dictionary data 210 in the matching in Step S309.

Next, the object recognition/angle estimation section 333 determines whether or not the score calculated in the matching in Step S309 exceeds a threshold (Step S313). Here, the score to be compared with the threshold is, for example, a highest matching score. Alternatively, the object recognition/angle estimation section 333 may determine whether or not what % (for example, 10%) of higher matching scores exceed the threshold. In a case in which the matching score does not exceed the threshold (NO) in determination in Step S313, the dictionary data update section 335 updates the dictionary data 210 (Step S315). On the other hand, in a case in which the matching score exceeds the threshold (YES) in the determination in Step S313, a process for updating the dictionary data 210 may not be executed. The result output section 334 outputs a result of estimation in Step S311 as needed.

Figure 12:
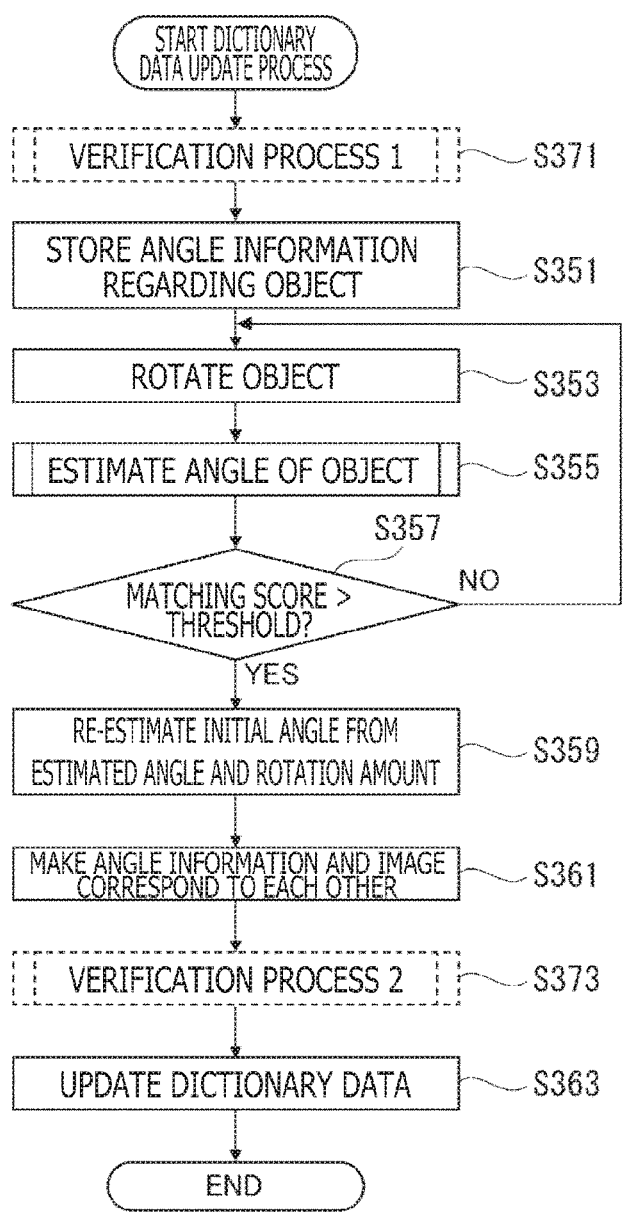
FIG. 12 is a flowchart depicting an example of a dictionary data update process in the first embodiment of the present invention.

FIG. 12 is a flowchart depicting an example of a dictionary data update process in the first embodiment of the present invention. With reference to FIG. 12, in the update process, first, the angle information acquisition/angle estimation section 337 in the robot 300 stores the angle information regarding the object obj provided from the manipulator control section 336 (Step S351). Here, the angle stored in Step S351 indicates the angle of the object obj in the coordinate system with reference to, for example, the manipulator 320. Next, the manipulator control section 336 rotates the object obj by controlling the manipulator 320 (Step S353).

After the object obj is rotated, the angle of the object obj is estimated (S355). A process in Step S355 corresponds to, for example, processes in Steps S301 to S311 depicted in FIG. 9. Specifically, the image acquisition section 331 acquires the image (second image) after the rotation of the object obj, and the object recognition/angle estimation section 333 estimates the angle of the object obj in the image (second image) after the rotation. It is noted that the dictionary data 210 acquired in previously executed Step S303 may be utilized and the object obj may be handled as being already recognized in previously executed Step S305.

Next, the dictionary data update section 335 determines whether or not a matching score in estimation in Step S355 exceeds the threshold (Step S357). This determination can be executed similarly to, for example, Step S313 depicted in FIG. 9. In a case in which the matching score does not exceed the threshold (NO) in determination in Step S357, the processes in Steps S353 and S355 are re-executed. In other words, the manipulator control section 336 rotates the object obj by controlling the manipulator 320 (Step S353), and the object recognition/angle estimation section 333 estimates the angle of the object obj in the image (third image) after the rotation (Step S355).

On the other hand, in a case in which the matching score exceeds the threshold (YES) in the determination in Step S357, the angle information acquisition/angle estimation section 337 re-estimates the initial angle $\theta_1$ from the angle $\theta_2$ estimated in Step S355 and the rotation amount $\Delta\theta$ of the object obj (Step S359). Here, the initial angle $\theta_1$ is the angle before the rotation of the object obj, which is the angle that cannot be estimated by the object recognition/angle estimation section 333 with sufficient reliability. On the other hand, the angle $\theta_2$ is the angle of the object obj estimated by the object recognition/angle estimation section 333 on the basis of the image (second image) after the rotation of the object obj and the dictionary data 210, and it is proved in the determination in Step S357 that the angle $\theta_2$ is estimated with sufficient reliability. Furthermore, the rotation amount $\Delta\theta$ is calculated on the basis of the angle information regarding the object obj stored in Step S351 and the angle information regarding the object obj provided from the manipulator control section 336 at timing of Step S353.

In a case in which processes in Steps S353 and S355 are repeated N times as a result of the determination in Step S357, the angle information acquisition/angle estimation section 337 re-estimates the initial angle $\theta_1$ from an angle $\theta_{N+1}$ estimated in finally executed Step S355 and a total rotation amount $\Delta\theta_{TTL}$ of the object obj in Step S353 executed N times. The total rotation amount $\Delta\theta_{TTL}$ is calculated on the basis of the angle information regarding the object obj stored in Step S351 and the angle information regarding the object obj provided from the manipulator control section 336 at the timing of Step S353.

Next, the dictionary data update section 335 makes the angle information corresponding to the initial angle $\theta_1$ re-estimated in Step S359 and the image (first image) before the rotation of the object obj acquired in Step S301 depicted in FIG. 9 correspond to each other (Step S361). Furthermore, the dictionary data update section 335 updates the dictionary data 210 on the basis of the image and the angle information made to correspond to each other in Step S361 (Step S363). Here, update of the dictionary data 210 includes addition of an element to the dictionary data 210 and/or substitution of an element for an element in the dictionary data 210.

In Step S363 described above, the dictionary data update section 335 adds an element to the dictionary data 210 on the basis of the image and the angle information. This increases the probability that the angle $\theta_1$ can be estimated with high reliability when the camera 310 in the robot 300 subsequently captures an image of the object obj at the angle $\theta_1$ on a similar environmental condition. In a case, for example, in which the dictionary data 210 is dedicated to the robot 300 and in which it is predicted that the environmental condition on which the camera 310 captures an image of the object obj does not change, the dictionary data update section 335 may substitute an element for an element in the dictionary data 210 on the basis of the image and the angle information.

As described so far, updating the dictionary data 210 makes it possible to accumulate additional dictionary data 210 for the angle of the object obj or for the environmental condition for which the angle of the object obj is difficult to estimate with high reliability using the initially generated dictionary data 210. In this way, the robot 300 that estimates the angle of the object obj using the dictionary data 210 autonomously enhances the dictionary data 210, thereby making it possible to improve estimation robustness.

(Example of Verification Process Before Update)

Here, the dictionary data update process described above with reference to FIG. 12 may include a verification process before the update of the dictionary data 210 as an additional process. As a first example, before Step S351 depicted in FIG. 12, a process (denoted as "verification process 1" in Step S371) for verifying whether or not to execute the dictionary data update process may be executed. In the verification process according to the first example, the image acquisition section 331 re-acquires an image of the object obj before the object obj is rotated in Step S353. The object recognition/angle estimation section 333 estimates the angle of the object obj in the re-acquired image. In a case in which a matching score in this estimation exceeds the threshold (unlike the estimation in Step S311 depicted in FIG. 9), then the dictionary data update process is halted and at least the update of the dictionary data in S363 is not executed.

For example, in the image acquired by the image acquisition section 331 in Step S301 depicted in FIG. 9 described above, an accidental factor such as a focus delay of the camera 310 or an instantaneous change in an illumination condition of the camera 310 (due to, for example, a thunder or flash light) causes an unexpected change in the image, which possibly causes reduction in estimation reliability. The verification process as in the first example above is effective for preventing the dictionary data 210 from being updated on the basis of low reproducibility information due to the accidental factor.

Furthermore, as a second example, after Step S361 depicted in FIG. 12, a process (denoted as "verification process 2" in Step S373) for verifying whether or not to update the dictionary data on the basis of the prepared angle information and image may be executed. In the verification process according to the second example, the dictionary data update section 335 generates provisional dictionary data based on the angle information and the image made to correspond to each other in Step S361. Next, the manipulator control section 336 controls the manipulator 320 and rotates the object obj in an opposite direction to that in Step S353. The angle of the object obj is thereby returned to the original angle $\theta_1$. Furthermore, the image acquisition section 331 newly acquires an image of the object obj the angle of which is returned to the original angle $\theta_1$, and the object recognition/angle estimation section 333 estimates an angle of the object obj in the image, which is newly acquired by the image acquisition section 331, on the basis of the provisional dictionary data generated by the dictionary data update section 335. Here, in a case in which the original angle $\theta_1$ can be estimated and the matching score exceeds the threshold, the dictionary data update section 335 executes the update of the dictionary data 210 in Step S363. Otherwise, the update of the dictionary data 210 in Step S363 is not executed.

The above second example is effective for preventing, for example, the update of the dictionary data 210 that does not contribute to improving estimation reliability of the angle. Even if the image acquisition section 331 updates the dictionary data 210 on the basis of the acquired image, the estimation reliability of the angle in a subsequently acquired similar image does not necessarily and possibly improve depending on the environmental condition on which the camera 310 captures an image of the object obj. The verification process as in the above second example is effective for preventing an increase in a capacity of the dictionary data 210 by unnecessary elements that do not necessarily contribute to improving the angle estimation reliability.

(Other Modification)

While the angle information acquisition/angle estimation section 337 re-estimates the angle after the object obj is rotated in the above examples, the angle information acquisition/angle estimation section 337 may re-estimate the angle after the robot 300 together with the object obj is moved by the motor 350. There is a probability that the environmental condition on which the camera 310 captures an image changes by movement of the robot 300 and that angle estimation with high reliability can be performed without rotating the object obj. It is noted that a configuration for moving the robot 300 is described in more detail in a third embodiment to be described later.

Moreover, the movement of the robot 300 described above may be combined with the rotation of the object obj. For example, the angle information acquisition/angle estimation section 337 may re-estimate an angle after the robot 300 together with the object obj is moved in a case in which sufficient reliability cannot be ensured even in the re-estimation of the angle after rotating the object obj. For example, in a case in which the environmental condition on which the camera 310 captures an image of the object obj greatly differs from the environmental condition of the camera 150 at a time of generating the dictionary data 210, a re-estimation process described above can be effective.

Functions of the system 10 according to the present embodiment are realized by being distributed to the terminal 100, the database 200, and the robot 300 in the example depicted in FIGS. 1, 2, and 7. In another example, most of the functions of the system 10 may be realized in the server. In other words, the functions described to be realized by the processors in the terminal 100 and the robot 300 in the above example may be realized by a processor in the server that includes the database 200. In this case, the terminal 100 transmits the image of the object obj captured by the camera 150 and the angle information regarding the object obj acquired from the camera platform device 160 to the server, and the server generates the dictionary data 210 by associating the image with the angle information. On the other hand, the robot 300 transmits the image of the object obj captured by the camera 310 to the server, and the server estimates the angle of the object obj on the basis of this image. The robot 300 receives the angle estimation result from the server. The server may request the robot 300 to rotate the object obj and to acquire the image of the object obj after the rotation for re-estimation of the angle in a case in which the reliability of the estimated angle does not exceed a threshold. It is noted that the number of servers realizing these functions is not necessarily one but that a plurality of servers distributed on a network may realize the above functions. Moreover, the server realizing the functions may be a different device from a storage including the database 200.

Second Embodiment

A second embodiment of the present invention will next be described. It is noted that the description of sections configured similarly to those in the first embodiment described above is often omitted by designating common reference symbols.

Figure 13:
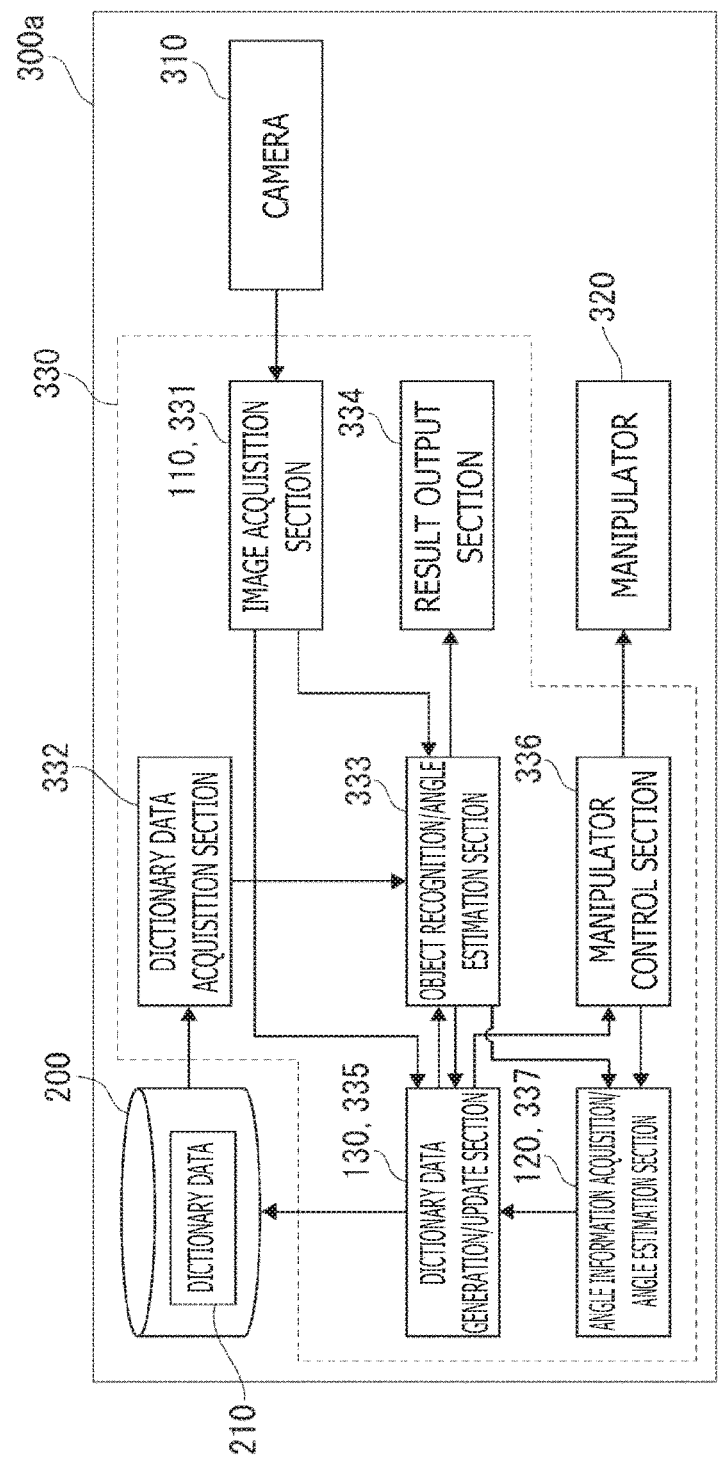
FIG. 13 is a block diagram depicting a functional configuration of a robot in a second embodiment of the present invention.

FIG. 13 is a block diagram depicting a functional configuration of a robot 300a according to the second embodiment of the present invention. With reference to FIG. 13, the overall functions related to the generation of the dictionary data 210 and the estimation of the angle of the object obj using the dictionary data 210 are realized by the robot 300a in the present embodiment. Specifically, the processor in the control section 330 of the robot 300a realizes an image acquisition section 110 or 331, an angle information acquisition/angle estimation section 120 or 337, a dictionary data generation/update section 130 or 335, the dictionary data acquisition section 332, the object recognition/angle estimation section 333, the result output section 334, and the manipulator control section 336. It is noted that in a case in which the control section 330 includes a plurality of processors, the plurality of processors may cooperate to realize the functions of the sections described above. Furthermore, as described later, part of or all of the functions realized by the processors in the control section 330 can be realized by the server. Moreover, the database 200 is stored in a storage of the control section 330 in the robot 300a. The sections will further be described below.

The image acquisition section 110 or 331 has the functions of both the image acquisition section 110 described above with reference to FIG. 2 and the image acquisition section 331 described with reference to FIG. 7. In other words, the image acquisition section 110 or 331 provides the image of the object obj captured by the camera 310 to the dictionary data generation/update section 130 or 335 when the dictionary data 210 is generated, and to the object recognition/angle estimation section 333 when the angle of the object obj is estimated using the dictionary data 210.

The angle information acquisition/angle estimation section 120 or 337 has the functions of both the angle information acquisition section 120 described above with reference to FIG. 2 and the angle information acquisition/angle estimation section 337 described with reference to FIG. 7. In other words, the angle information acquisition/angle estimation section 120 or 337 provides the angle information acquired from the manipulator control section 336 to the dictionary data generation/update section 130 or 335 when the dictionary data 210 is generated. In addition, the angle information acquisition/angle estimation section 120 or 337 calculates the rotation amount $\Delta\theta$ of the object obj on the basis of the angle information acquired from the manipulator control section 336 and furthermore estimates the initial angle $\theta_1$ on the basis of the rotation amount $\Delta\theta$ and the angle $\theta_2$ estimated by the object recognition/angle estimation section 333 when the dictionary data 210 is updated.

It is noted that the angle information acquired by the angle information acquisition/angle estimation section 337 in the robot 300 can indicate the angle of the object obj with reference to the coordinate system of the manipulator 320 in the present embodiment. In this case, the angle of the object obj indicated by the angle information acquired by the angle information acquisition/angle estimation section 337 possibly changes depending on not only the rotation amount of the manipulator 320 set by the manipulator control section 336 but also operation amounts of the other constituent elements, such as an arm, of the robot 300 coupled to the manipulator 320. Furthermore, a surface of the object obj gripped by the manipulator 320 possibly varies at different times. Therefore, even if the same manipulator 320 as that at the time of generating the dictionary data 210 grips the object obj, it can be useful to estimate the angle of the object obj in the image using the dictionary data 210.

The dictionary data generation/update section 130 or 335 has the functions of both the dictionary data generation section 130 described above with reference to FIG. 2 and the dictionary data update section 335 described with reference to FIG. 7. In other words, the dictionary data generation/update section 130 or 335 generates the dictionary data 210 on the basis of the image acquired by the image acquisition section 110 or 331 and the angle information acquired by the angle information acquisition/angle estimation section 120 or 337 when generating the dictionary data 210. In addition, the dictionary data generation/update section 130 or 335 updates the dictionary data 210 in response to the result of the estimation of the angle of the object obj by the object recognition/angle estimation section 333 and a result of re-estimation of the angle by the angle information acquisition/angle estimation section 120 or 337 when estimating the angle of the object obj using the dictionary data 210.

As indicated by the second embodiment described above, the functions of the system 10 according to the first embodiment can be realized by a single device, for example, the robot 300a. In this case, it can be said that the system 10 is realized by the single device. Likewise, the configuration of the system 10 can be realized by various device configurations. For example, the system 10 may include a plurality of robots 300, and each of the robots 300 may execute the generation of the dictionary data 210 and the estimation of the angle of the object using the dictionary data 210. In this case, the dictionary data 210 stored in the database 200 is shared among the plurality of robots 300.

Furthermore, the server including the database 200, for example, may realize the functions as realized by the control section 330 in the robot 300a in the second embodiment described above. In this case, at the time of generating the dictionary data, the robot 300a transmits the image of the object obj captured by the camera 310 and the angle information regarding the object obj acquired from the manipulator control section 336 to the server, and the server generates the dictionary data 210 by associating the image with the angle information. On the other hand, at the time of the angle estimation, the robot 300a transmits the image of the object obj captured by the camera 310 to the server, and the server estimates the angle of the object obj on the basis of this image. The robot 300a receives an angle estimation result from the server. The server may request the robot 300a to rotate the object obj and to acquire the image of the object obj after the rotation for re-estimation of the angle in the case in which the reliability of the estimated angle does not exceed the threshold.

Third Embodiment

A third embodiment of the present invention will next be described. It is noted that the description of sections configured similarly to those in the second embodiment described above is often omitted by designating common reference symbols.

Figure 14:
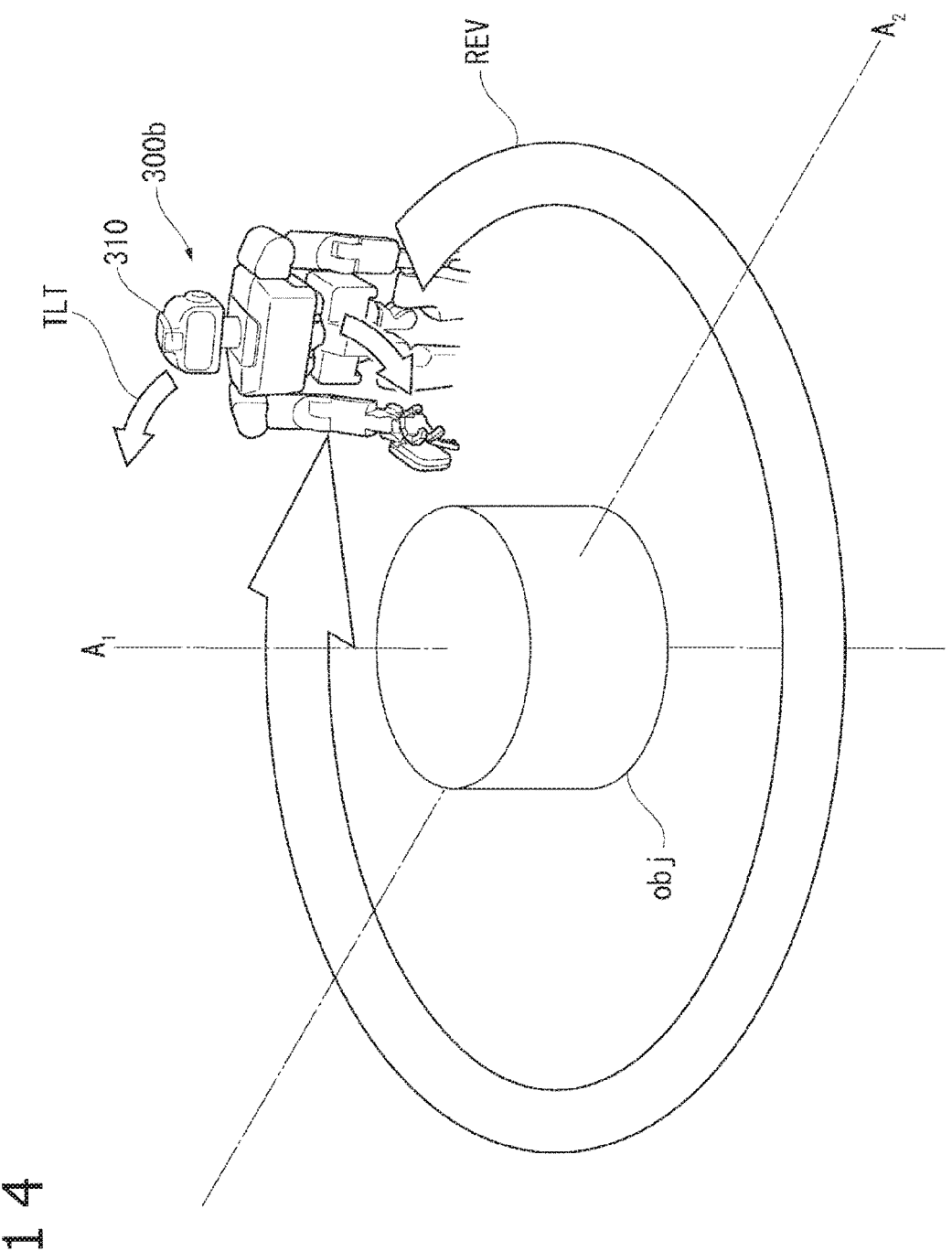
FIG. 14 is a schematic explanatory diagram of a third embodiment of the present invention.

FIG. 14 is a schematic explanatory diagram of the third embodiment of the present invention. With reference to FIG. 14, a robot 300b moves relatively to the object obj as an alternative to gripping the object using the manipulator in the present embodiment. In an example depicted in FIG. 14, movement of the robot 300b includes a revolution movement REV about the object. At this time, the object obj rotates about the axis $A_1$ in an image captured by the camera 310. The movement of the robot 300b also includes a tilt TLT of the camera 310 with respect to the object obj. At this time, the object obj rotates about the axis $A_2$ in an image captured by the camera 310.

Figure 15:
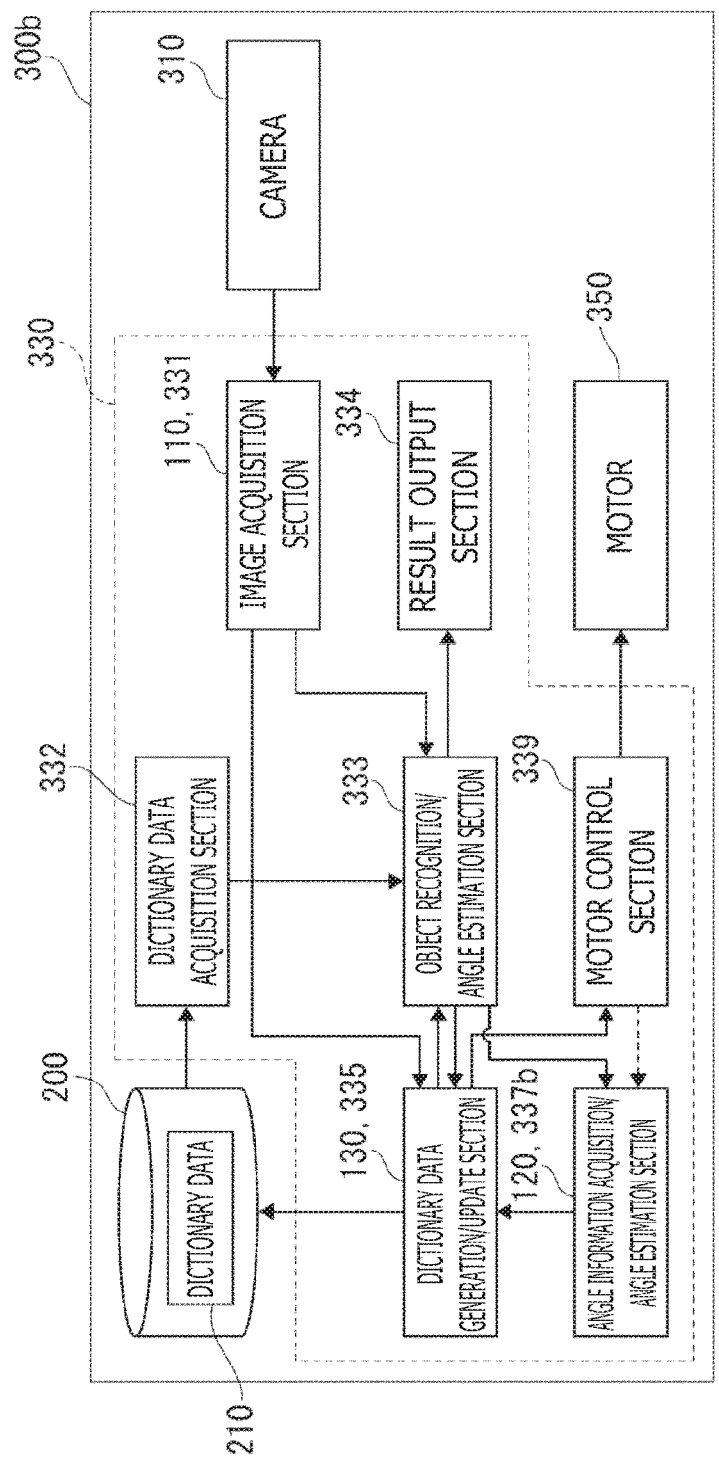
FIG. 15 is a block diagram depicting a functional configuration of a robot according to the third embodiment of the present invention.

FIG. 15 is a block diagram depicting a functional configuration of the robot 300b according to the third embodiment of the present invention. The robot 300b according to the present embodiment differs from the robot 300a depicted in FIG. 13 in that the robot 300b includes a motor control section 339 that controls the motor 350 as an alternative to the manipulator control section 336 that controls the manipulator 320.

The motor control section 339 controls the motor 350 of the robot 300. As described above with reference to FIG. 6, the motor 350 includes a motor for moving the robot 300b or changing a posture of the robot 300b by actuating a joint structure of the robot 300 or rotating wheels of the robot 300b. The motor control section 339 controls the motor 350 in such a manner as to execute the revolution movement of the robot 300b about the object obj and/or the tilt of the camera 310 in the robot 300b with respect to the object obj, as described above with respect to FIG. 14.

An angle information acquisition/angle estimation section 120 or 337b acquires angle information indicating the angle of the object obj. Here, the angle information is acquired by, for example, executing image-based simultaneous localization and mapping (SLAM) using a plurality of images in time series acquired by the image acquisition section 331 during the movement of the robot 300 and the camera 310. It is noted that the SLAM may be executed using a measurement result of the other sensor 340 such as the depth sensor or a laser range scanner owned by the robot 300a. In this case, the angle information acquisition/angle estimation section 120 or 337b acquires the angle information regarding the object obj on the basis of a position relationship between the camera 310 and the object obj identified separately, upon identifying a movement amount of the camera 310 by the SLAM. Alternatively, the angle information acquisition/angle estimation section 120 or 337b may identify the movement amount of the camera 310 on the basis of a controlling value over the motor 350 by the motor control section 339.

In the present embodiment, the dictionary data 210 can be generated using the angle information acquired as described above. Furthermore, in a case in which the object recognition/angle estimation section 333 cannot estimate the angle with sufficient reliability on the basis of the dictionary data 210, the motor control section 339 controls the motor 350, thereby rotating the object obj in the image and it is possible to execute the re-estimation of the angle and the update of the dictionary data 210. In the present embodiment, the relative movement of the camera 310 to the object obj is an example of the physical operation related to the object obj executed in re-estimating the angle of the object obj.

According to the configuration of the third embodiment of the present invention described so far, it is possible to generate the dictionary data 210 for estimating the angle of the object obj even in a case in which the object obj is large or in which the object obj is small but is immovable. Here, the robot 300b may also have the manipulator 320 and the manipulator control section 336 described with reference to FIG. 7, and may rotate the object obj using the manipulator 320 similarly to the first and second embodiments in a case in which the object obj can be gripped.

While the overall functions related to the generation of the dictionary data 210 and the estimation of the angle of the object obj using the dictionary data 210 are realized by the robot 300b in an example of the third embodiment described above similarly to the second embodiment, another example is also possible. For example, the robot 300 may include the motor control section 339 as an alternative to the manipulator control section 336 or in addition to the manipulator control section 336 in the system 10 according to the first embodiment.

For example, in a case in which the camera platform device 160 (or the robot 300) used when the dictionary data 210 is generated differs in size from the robot 300 that estimates the angle of the object obj using the dictionary data 210, a case in which the object obj can be rotated using the camera platform device 160 (or the manipulator 320) at the time of generating the dictionary data 210 while it is difficult to rotate the object obj at the time of updating the dictionary data 210 or an opposite case possibly occurs.

Moreover, in a case, for example, in which the robot 300 includes not only the manipulator control section 336 but also the motor control section 339 as described above, the motor control section 339 may control the motor 350 in such a manner that the camera 310 can move together with the object obj. In this case, the manipulator control section 336 controls the manipulator 320 in such a manner that the angle of the object obj in the image does not change. Specifically, while the motor control section 339 controls the motor 350 to move the robot 300, the manipulator control section 336 holds the position relationship between the manipulator 320 and the camera 310 and the angle at which the manipulator 320 grips the object obj.

In this way, moving the camera 310 together with the object obj makes it possible to change the environmental condition on which the camera 310 captures an image without, for example, changing the angle of the object obj in the image. This possibly enables the estimation with high reliability by changing the environmental condition in a case, for example, in which it is difficult to estimate the angle of the object obj with high reliability on the basis of the dictionary data 210 on a certain environmental condition. Furthermore, containing a plurality of elements, for which a plurality of images acquired on different environmental conditions are made to correspond to common angle information, in the dictionary data 210 at the time of generating the dictionary data 210 makes it possible to improve angle estimation robustness.

In the above example, in the update process of the dictionary data 210, first, the motor control section 339 moves the camera 310 together with the object obj by controlling the motor 350. After the movement of the camera 310 and the object obj, the image acquisition section 331 acquires the image (second image) after the movement of the object obj, and the object recognition/angle estimation section 333 re-estimates the angle of the object obj in the image (second image) after the movement. In a case in which a matching score exceeds a threshold in this estimation, the dictionary data update section 335 updates the dictionary data on the basis of the angle information corresponding to the re-estimated angle of the object obj and the image (first image) acquired by the image acquisition section 331 before the movement of the object obj. In this example, the movement of the camera 310 together with the object obj corresponds to the physical operation related to the object obj executed in re-estimating the angle of the object obj. Furthermore, in this example, the object recognition/angle estimation section 333 carries out both the "first angle estimation function" and the "second angle estimation function" described above.

(Example of Hardware Configuration of Information Processing Device)

Figure 16:
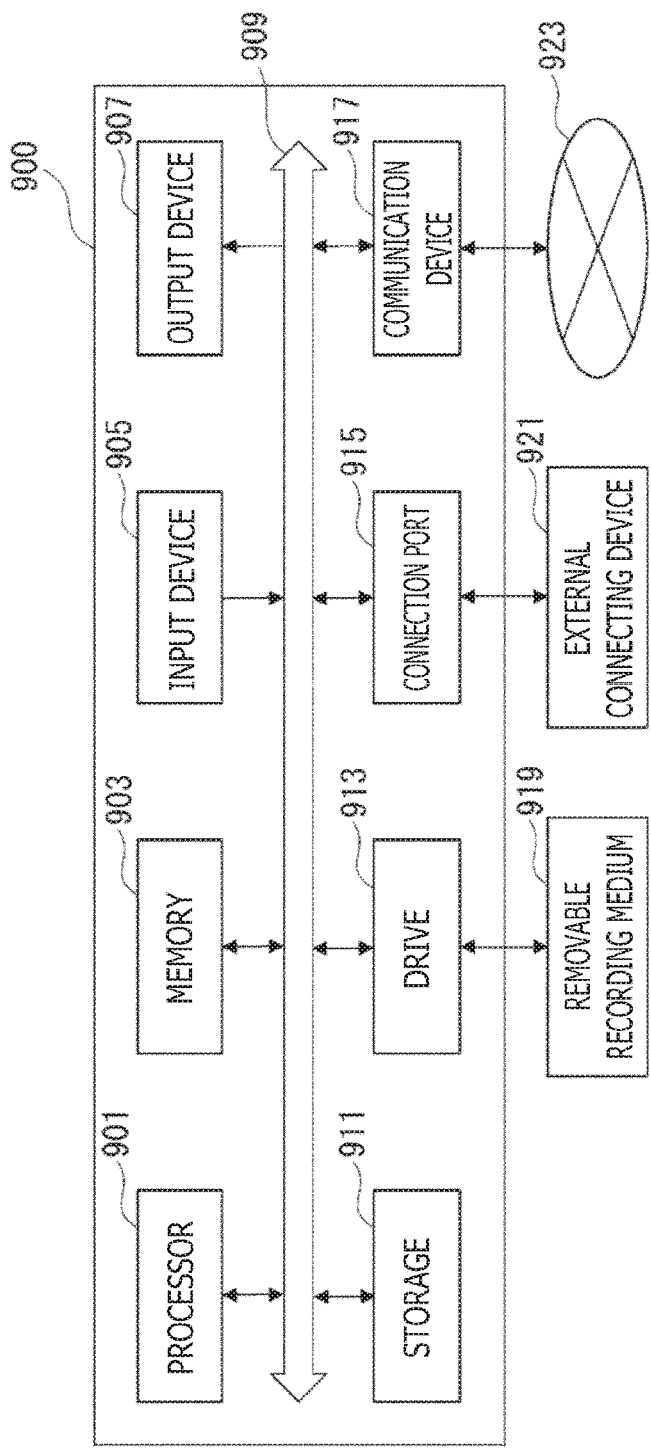
FIG. 16 is a block diagram depicting an example of a hardware configuration of an information processing device according to the embodiments of the present invention.

An example of the hardware configuration of the information processing device according to the embodiments of the present invention will next be described with reference to FIG. 16. FIG. 16 is a block diagram depicting an example of the hardware configuration of the information processing device according to the embodiments of the present invention.

An information processing device 900 includes a processor 901, a memory 903, an input device 905, an output device 907, and a bus 909. The information processing device 900 may also include a storage 911, a drive 913, a connection port 915, and a communication device 917.

The processor 901 is configured with, for example, a processing circuit such as a central processing unit (CPU), a digital signal processor (DSP), an application specific integrated circuit (ASIC), and/or a field-programmable gate array (FPGA). The processor 901 functions as an arithmetic processing device and a control device, and controls the information processing device 900 to operate in accordance with a program recorded in the memory 903, the storage 911, or a removable recording medium 919.

Examples of the memory 903 include a read only memory (ROM) and a random access memory (RAM). The ROM stores, for example, a program and arithmetic parameters for the processor 901. The RAM temporarily stores, for example, a program expanded at a time of executing the processor 901 and parameters at a time of executing the program.

The input device 905, which is, for example, a mouse, a keyboard, a touch panel, a button, and various switches, is a device operated by the user. The input device 905 is not necessarily integrated with the information processing device 900 and may be, for example, a remote controller that transmits control signals by wireless communication. The input device 905 includes an input control circuit that generates an input signal on the basis of user's input information and that outputs the input signal to the processor 901.

The output device 907 is configured with a device that can output information to the user using such sensations as a visual sensation, an auditory sensation, and a touch sensation. Examples of the output device 907 can include a display device such as a liquid crystal display (LCD) and an organic electro-luminescence (EL) display, an audio output device such as a loudspeaker and headphones, and a vibrator. The output device 907 outputs a result obtained by processes performed by the information processing device 900 as text, a visual such as an image, an audio such as a voice or a sound, or a vibration.

The storage 911 is configured with, for example, a magnetic storage device such as a hard disk drive (HDD), a semiconductor storage device, an optical storage device, or a magneto-optical storage device. The storage 911 stores, for example, a program for the processor 901, various data read at the time of executing the program or generated by executing the program, and various data acquired from outside.

The drive 913 is a reader-writer for the removable recording medium 919 such as a magnetic disk, an optical disk, a magneto-optical disk, or a semiconductor memory. The drive 913 reads information recorded in the attached removable recording medium 919 and outputs the information to the memory 903. Furthermore, the drive 913 writes various data to the attached removable recording medium 919.

The connection port 915 is a port for connecting an external connecting device 921 to the information processing device 900. Examples of the connection port 915 can include a universal serial bus (USB) port, an Institute of Electrical and Electronics Engineers (IEEE)1394 port, a small computer system interface (SCSI) port. Furthermore, the connection port 915 may include an RS-232C port, an optical audio terminal, a high-definition multimedia interface (HDMI) (registered trademark) port, and the like. Connecting the external connecting device 921 to the connection port 915 enables exchange of various data between the information processing device 900 and the external connecting device 921.

The communication device 917 is connected to a network 923. It is noted that the network 923 may be an open communication network which is, for example, the Internet to which an unspecified number of devices are connected, or a closed communication network to which limited devices such as Bluetooth (registered trademark)-capable devices, for example, two devices are connected. Examples of the communication device 917 can include communication cards for local area network (LAN), Bluetooth (registered trademark), wireless fidelity (Wi-Fi), and wireless USB (WUSB). The communication device 917 transmits and receives signals, data, and the like to and from the other information processing device using a predetermined protocol compatible with the network 923.

The example of the hardware configuration of the information processing device 900 has been described above. Each of the constituent elements may be configured with a general-purpose member or may be configured with hardware specialized in the function of each constituent element. Furthermore, persons skilled in the art can change the configuration of the information processing device 900 described above as appropriate depending on technical levels at different times of execution.

The embodiments of the present invention can include, for example, the system, the jig, and the information processing device as described above, an information processing method executed by the information processing device, a program for causing the information processing device to function, and a non-transitory tangible medium in which the program is recorded.

While several embodiments of the present invention have been described in detail with reference to the accompanying drawings, the present invention is not limited to these examples. It is obvious that persons having ordinary skill in the art to which the present invention pertains can conceive of various change examples or modification examples within the scope of the technical concept set forth in the claims, and it is understood that these examples naturally belong to the technical range of the present invention.

REFERENCE SIGNS LIST

10 . . . System, 100 . . . Terminal, 110 . . . Image acquisition section, 120 . . . Angle information acquisition section, 130 . . . Dictionary data generation section, 150 . . . Camera, 160 . . . Camera platform device, 161 . . . Base, 162 . . . Strut, 163 . . . Arm, 164 . . . Pin, 165 . . . Holder, 167 . . . Control section, 170 . . . Jig, 171 . . . Mounting member, 172 . . . Coupling member, 173 . . . Object holder, 174 . . . Background plate, 200 . . . Database, 210 . . . Dictionary data, 300, 300a, 300b . . . Robot, 310 . . . Camera, 320 . . . Manipulator, 330 . . . Control section, 331 . . . Image acquisition section, 332 . . . Dictionary data acquisition section, 333 . . . Object recognition/angle estimation section, 334 . . . Result output section, 335 . . . Dictionary data update section, 336 . . . Manipulator control section, 337" Angle information acquisition/angle estimation section, 339 . . . Motor control section, 340 . . . Sensor, 350 . . . Motor.

The invention claimed is:

1. An information processing device comprising:
a processor carrying out actions, including:
acquiring dictionary data related to an object,
acquiring a first image of the object,
estimating an angle of the object in the first image on a basis of the first image and the dictionary data,
re-estimating an angle, as a second angle, of the object in the first image after a physical operation related to the object, and
updating the dictionary data in response to a result of estimation by the estimating the first angle and a result of re-estimation the second angle,
wherein the physical operation related to the object includes rotation of the object by a holding mechanism that holds the object, and the estimating the second angle re-estimates an angle of the object in the first image on a basis of a rotation amount of the object provided from the holding mechanism.

2. The information processing device according to claim 1, wherein the updating the dictionary data updates the dictionary data on a basis of the first image and angle information indicating the angle of the object re-estimated by the estimating the second angle.

3. The information processing device according to claim 1, wherein the updating the dictionary data updates the dictionary data on the basis of the result of the re-estimation by the estimating the second angle in a case in which reliability of the angle of the object estimated by the estimating the first angle does not exceed a threshold.

4. The information processing device according to claim 1, wherein:
the acquiring the image acquires a second image of the object after the physical operation related to the object,
the estimating the first angle estimates an angle of the object in the second image on a basis of the second image and the dictionary data, and
the estimating the second angle re-estimates an angle of the object in the first image on the basis of the angle of the object, which is estimated by the estimating the first angle on the basis of the second image and the dictionary data, and an amount of the physical operation related to the object.

5. The information processing device according to claim 4, wherein:
the acquiring the image acquires a third image of the object after re-executing the physical operation related to the object in a case in which the reliability of the angle of the object estimated by the estimating the first angle on the basis of the second image and the dictionary data does not exceed the threshold,
the estimating the first angle estimates an angle of the object in the third image on a basis of the third image and the dictionary data, and
the estimating the second angle re-estimates an angle of the object in the first image on the basis of the angle of the object, which is estimated by the estimating the first angle on the basis of the third image and the dictionary data, and a total amount of the physical operation related to the object in a case in which reliability of the angle of the object estimated by the estimating the first angle on the basis of the third image and the dictionary data exceeds the threshold.

6. The information processing device according to claim 1, wherein:
the physical operation related to the object includes relative movement of an imaging device, which provides an image to the acquiring the image, to the object, and
the estimating the second angle re-estimates an angle of the object in the first image on a basis of a movement amount of the imaging device.

7. The information processing device according to claim 6, wherein the movement of the imaging device includes revolution movement about the object.

8. The information processing device according to claim 6, wherein:
the acquiring the image acquires a plurality of images in time series during the movement of the imaging device, and
the estimating the second angle identifies the movement amount of the imaging device on a basis of the plurality of images.

9. The information processing device according to claim 1, wherein the physical operation related to the object includes movement of an imaging device, which provides an image to the acquiring the image, together with the object.

10. An information processing method comprising:
acquiring dictionary data related to an object;
acquiring a first image of the object;
estimating an angle of the object in the first image on a basis of the first image and the dictionary data;
re-estimating an angle, as a second angle, of the object in the first image after a physical operation related to the object; and
updating, by a processor, the dictionary data in response to a result of the estimating and a result of the re-estimating,
wherein the physical operation related to the object includes rotation of the object, and the estimating the second angle re-estimates an angle of the object in the first image on a basis of a rotation amount of the object.

11. A non-transitory, computer readable storage medium containing a computer program, which when executed by a computer, causes the computer to carry out actions, comprising:
acquiring dictionary data related to an object;
acquiring a first image of the object;
estimating an angle of the object in the first image on a basis of the first image and the dictionary data;

re-estimating an angle, as a second angle, of the object in the first image after a physical operation related to the object; and updating the dictionary data in response to a result of estimation by the estimating the first angle and a result of re-estimation by the estimating the second angle, wherein the physical operation related to the object includes rotation of the object, and the estimating the second angle re-estimates an angle of the object in the first image on a basis of a rotation amount of the object.

12. An information processing device comprising:

a processor carrying out actions, including:

acquiring dictionary data related to an object, acquiring a first image of the object, estimating an angle of the object in the first image on a basis of the first image and the dictionary data, re-estimating an angle of the object in the first image after a physical operation related to the object, and updating the dictionary data in response to a result of estimation by the estimating the first angle and a result of re-estimation by the estimating the second angle, wherein the physical operation related to the object includes relative movement of an imaging device, which provides an image to the acquiring the image, to the object, and the estimating the second angle re-estimates an angle of the object in the first image on a basis of a movement amount of the imaging device.

* * * * *